United States Patent [19]
Tymes et al.

[11] Patent Number: 5,479,441
[45] Date of Patent: * Dec. 26, 1995

[54] PACKET DATA COMMUNICATION SYSTEM

[75] Inventors: LaRoy Tymes, Palo Alto, Calif.; John W. Kramer, Jr., Allison Park, Pa.

[73] Assignee: Symbol Technologies, Bohemia, N.Y.

[ * ] Notice: The portion of the term of this patent subsequent to Jul. 2, 2008, has been disclaimed.

[21] Appl. No.: 183,069

[22] Filed: Jan. 18, 1994

Related U.S. Application Data

[60] Division of Ser. No. 799,172, Nov. 27, 1991, Pat. No. 5,280,498, which is a continuation-in-part of Ser. No. 635,859, Dec. 28, 1990, Pat. No. 5,142,550, which is a continuation-in-part of Ser. No. 374,452, Jun. 29, 1989, Pat. No. 5,029,183.

[51] Int. Cl.$^6$ .................................................. H04B 1/69
[52] U.S. Cl. ............................................................. 375/200
[58] Field of Search .................................................. 375/1

[56] References Cited

U.S. PATENT DOCUMENTS

| | | | |
|---|---|---|---|
| 3,641,433 | 2/1972 | Mifflin et al. | 375/1 |
| 4,247,908 | 1/1981 | Lockhart et al. | 364/900 |
| 4,291,409 | 9/1981 | Weinberg et al. | 375/1 |
| 4,332,027 | 5/1982 | Malcolm et al. | 370/94 |
| 4,409,470 | 10/1983 | Shepard et al. | 235/472 |
| 4,475,208 | 10/1984 | Ricketts | 375/1 |
| 4,639,914 | 1/1987 | Winters | 370/110.1 |
| 4,672,658 | 6/1987 | Kavehrad et al. | 379/63 |
| 4,689,785 | 8/1987 | Toyonaga et al. | 370/85 |
| 4,689,786 | 8/1987 | Sidhu et al. | 370/94 |
| 4,697,281 | 9/1987 | O'Sullivan | 379/59 |
| 4,740,792 | 4/1988 | Sagey et al. | 342/457 |
| 4,789,983 | 12/1988 | Acampora et al. | 370/96 |
| 4,829,540 | 5/1989 | Waggener et al. | 375/1 |
| 4,850,009 | 7/1989 | Zook et al. | 379/96 |
| 4,933,953 | 12/1990 | Yagi | 375/1 |
| 4,995,053 | 2/1991 | Simpson et al. | 375/1 |
| 5,008,899 | 4/1991 | Yamamoto | 375/1 |
| 5,029,183 | 7/1991 | Tymes | 375/1 |
| 5,111,478 | 5/1992 | McDonald | 371/1 |
| 5,258,995 | 11/1993 | Su et al. | 375/1 |
| 5,289,497 | 2/1994 | Jacobson et al. | 375/1 |
| 5,311,542 | 5/1994 | Eder | 375/1 |

FOREIGN PATENT DOCUMENTS 3304451  10/1984  Germany .

OTHER PUBLICATIONS

Chow, et al., "A Spread Spectrum Modem for Reliable Data Transmission in the High Frequency Band," 2d Conference on HF Comm. Sys. and Techniques, IEE, London, 15 Feb. 1982.

MSI Data Corporation, Costa Mesa, Calif.; Product Brochure; MSI PRT Portable Radio Terminal; 2 pages; 1988.

Vectran Corporation, Pittsburgh, Pa.; Product Brochure; VR1100, VR1120, VR1130, VR1150, Radio Terminals; 13 pages; 1988.

Freret et al., "Applications of Spread Spectrum Radio to Wireless Terminal Communications"; Conference Record NTC Conference; Nov. 30, 1980; p. 69.7.1.

*Primary Examiner*—David C. Cain
*Attorney, Agent, or Firm*—Arnold, White & Durkee

[57] ABSTRACT

A packet data transmission system is used to link a number of remote hand-held data-gathering units such as bar code readers to a central computer which maintains a database management system. Data packets are sent from the remote units by an RF link to intermediate base stations, then sent by the base stations to the central computer by a serial link. Direct sequence spread spectrum modulation is used for the RF link. The remote hand-held units initiate an exchange using RF transmission to and from the base stations, receiving only during a rigid time window following a transmission from the remote unit. The base stations cannot initiate communication to the remote units, but instead send data to the remote units only as part of the exchange.

12 Claims, 13 Drawing Sheets

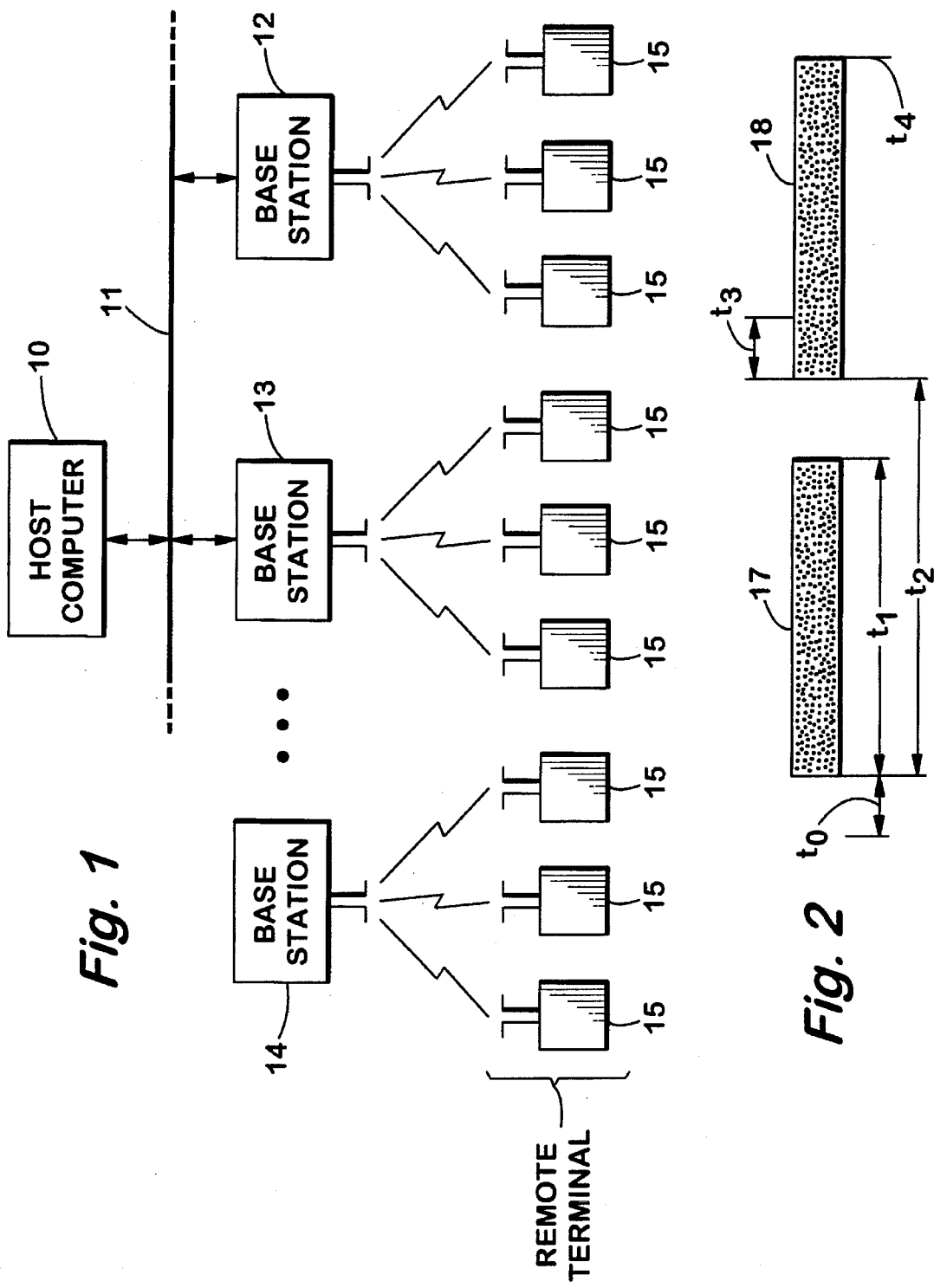

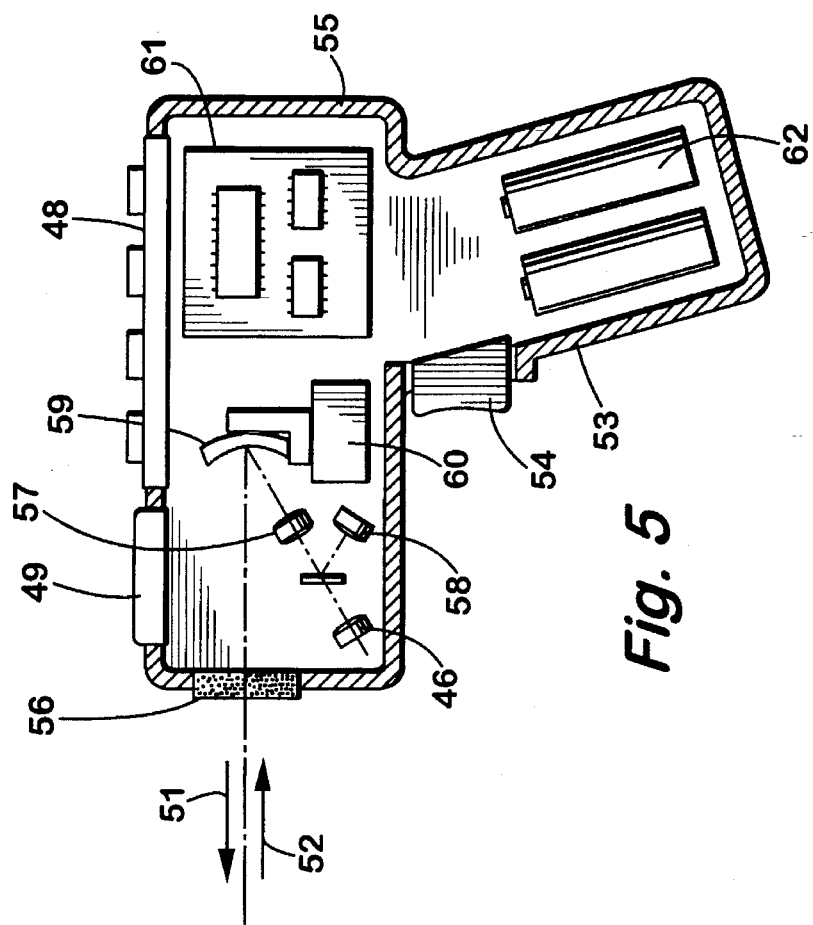
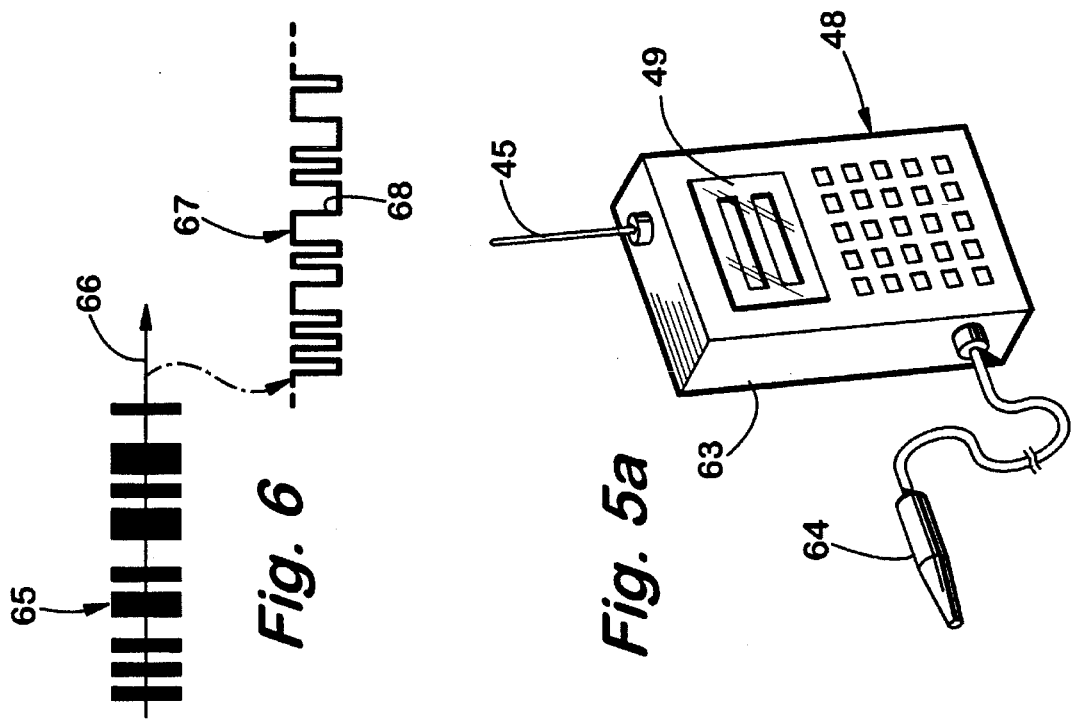
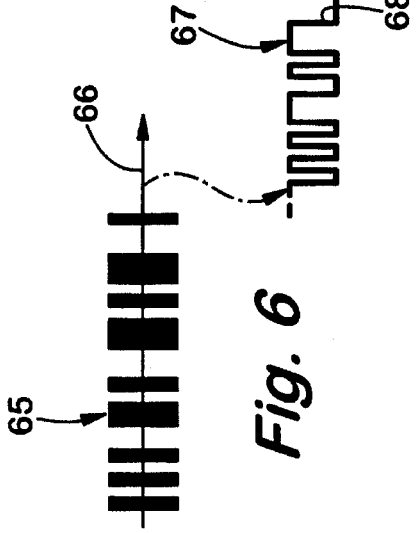

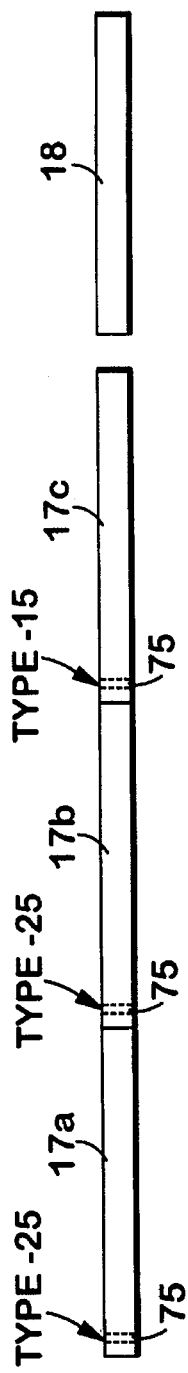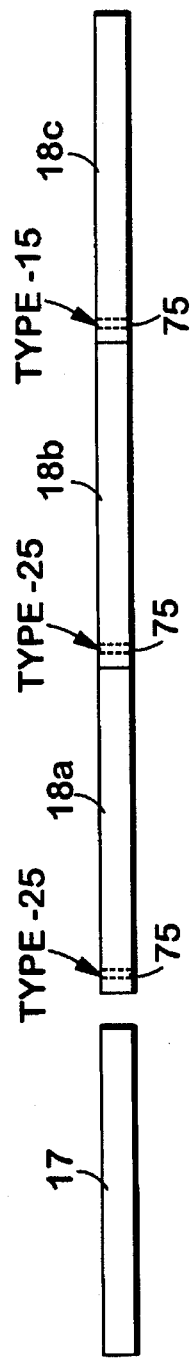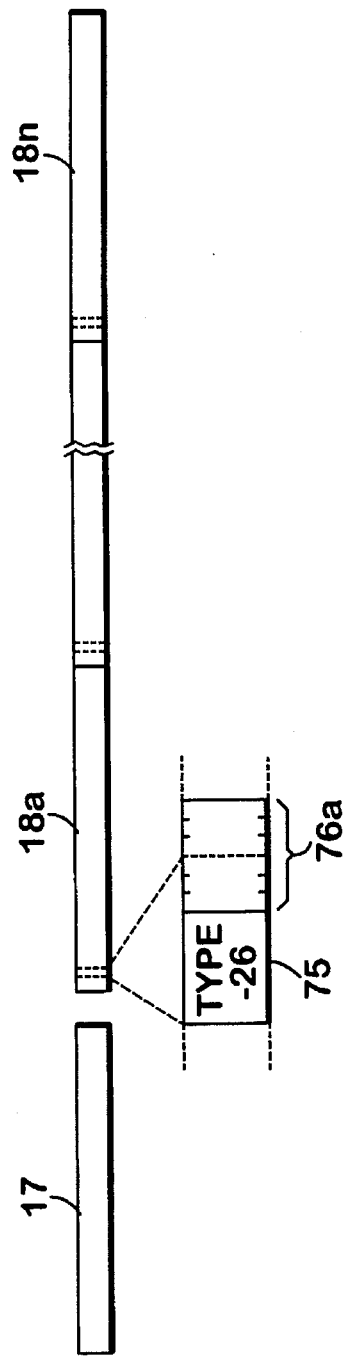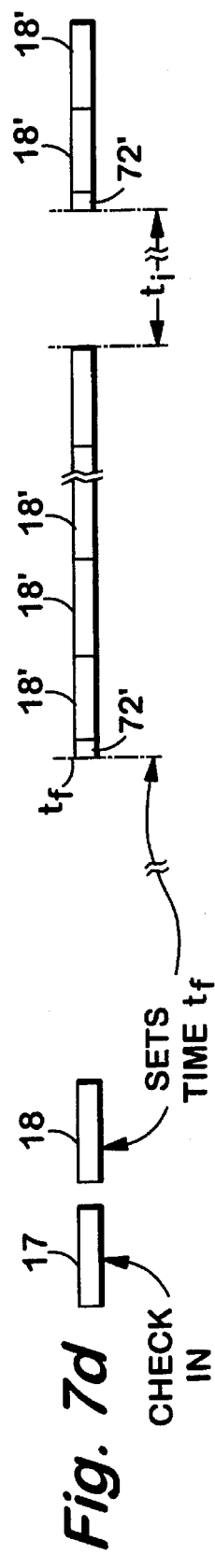

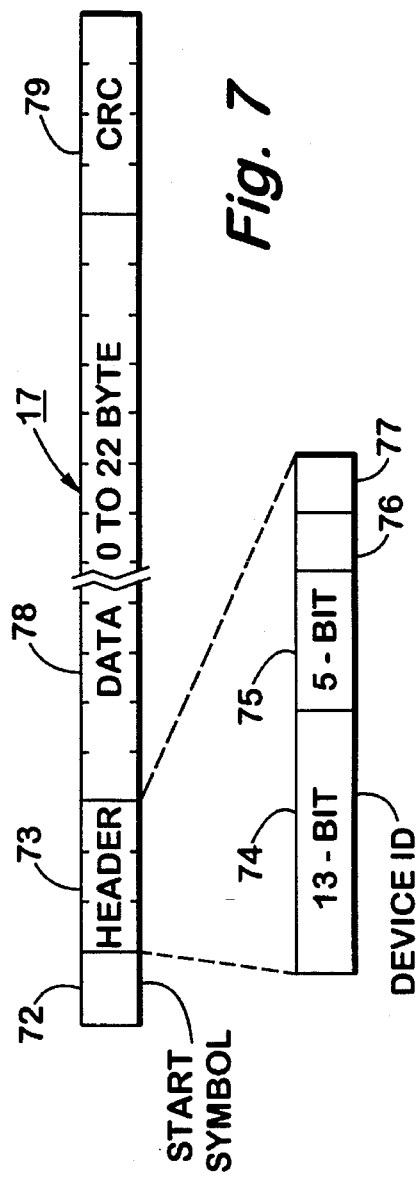
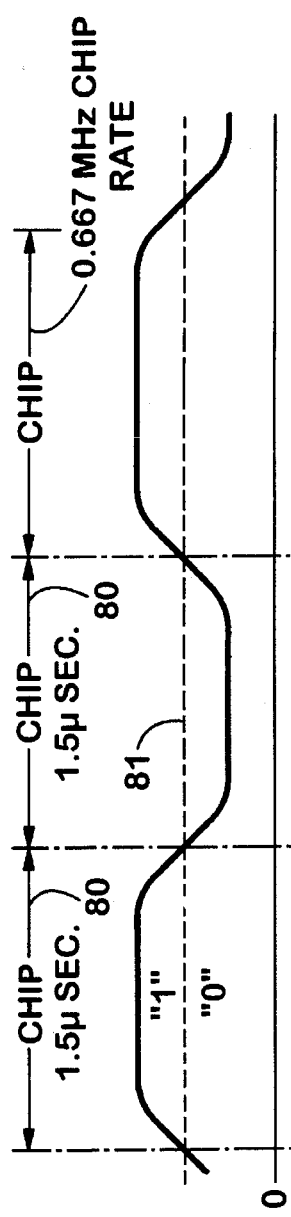
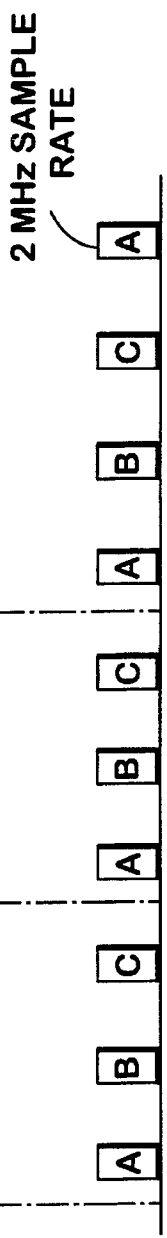
Fig. 7
Fig. 8a
Fig. 8b
Fig. 8c

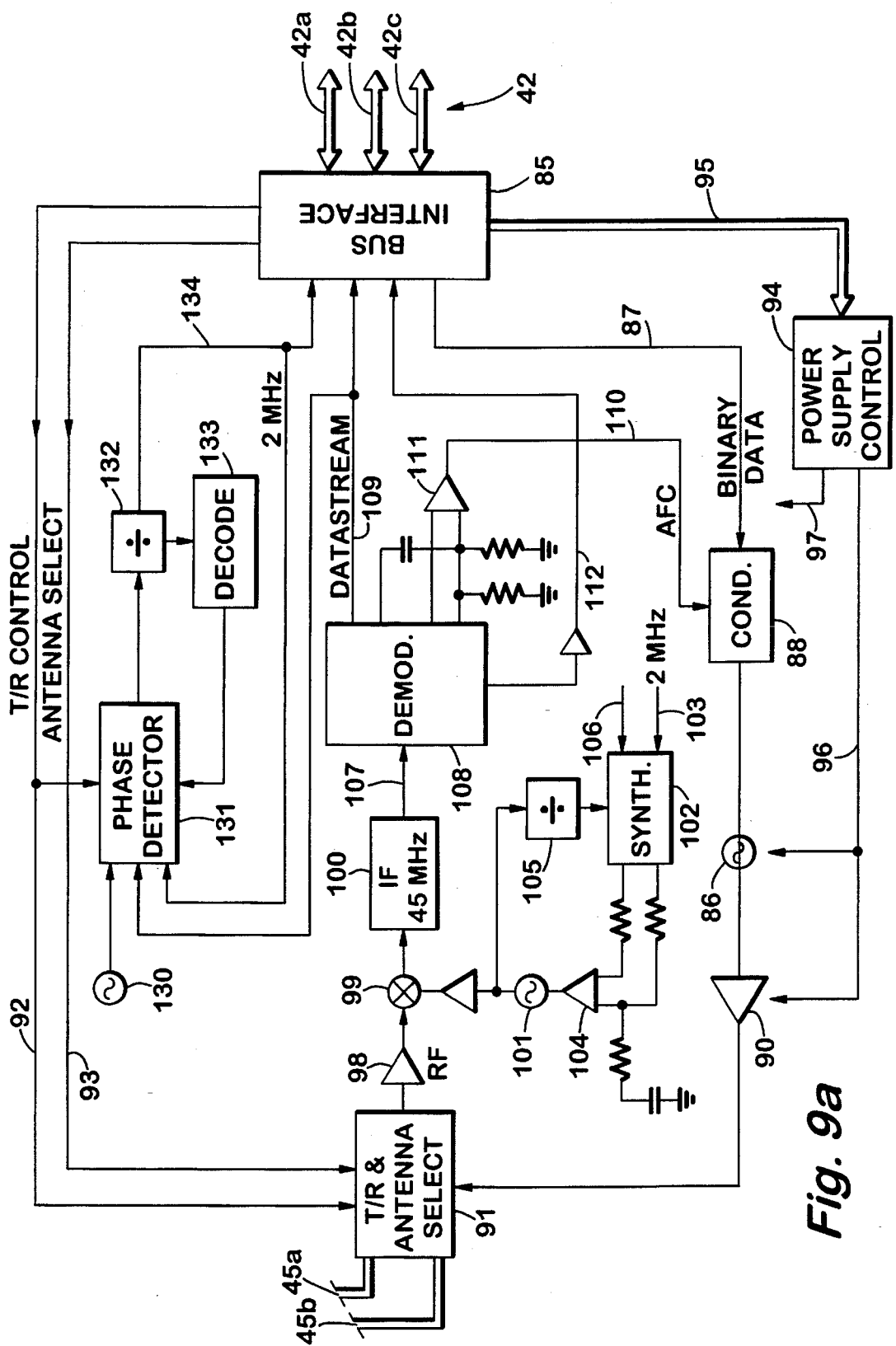

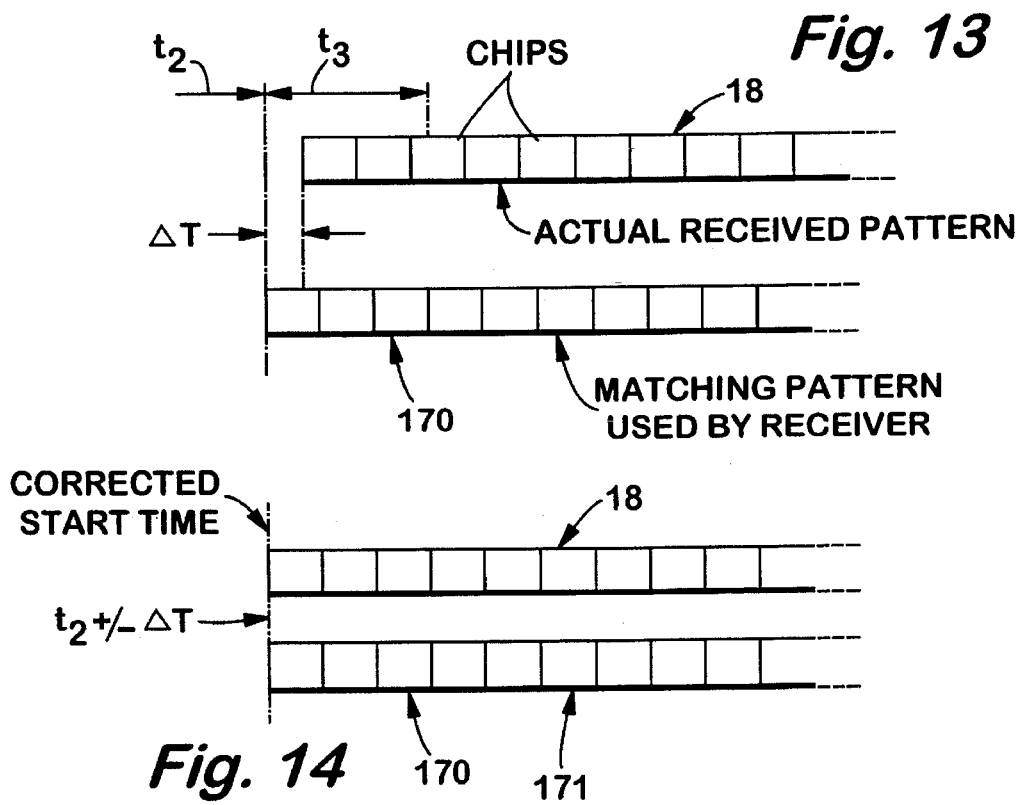
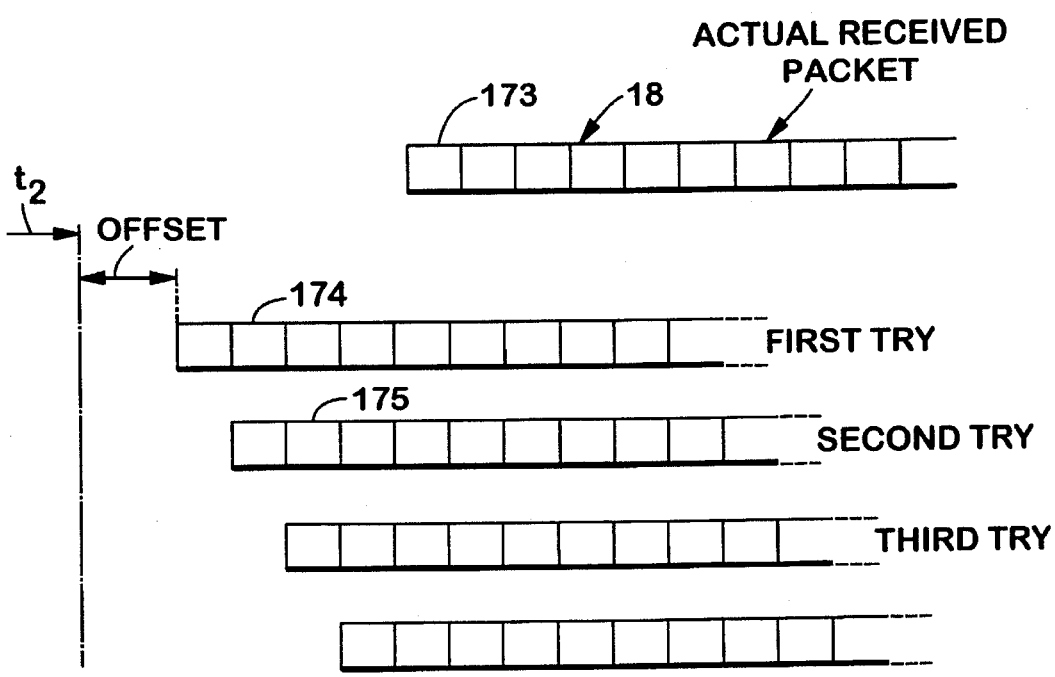

PACKET DATA COMMUNICATION SYSTEM

RELATED CASES

This application is a division of application Ser. No. 799,172, now U.S. Pat. No. 5,280,498, which was a continuation-in-part of application Ser. No. 635,859, filed Dec. 28, 1990, now U.S. Pat. No. 5,142,550, which was a continuation-in-part of application Ser. No. 374,452, filed Jun. 29, 1989, now U.S. Pat. No. 5,029,183, issued Jul. 2, 1991.

BACKGROUND OF THE INVENTION

This invention relates to data communication systems, and more particularly to an RF packet communication system in which a number of remote units send data to a central computer via intermediate base stations.

Bar code readers used in retail or commercial facilities are usually connected to a central computer by physical wiring. This connection is quite suitable for permanently-mounted bar code readers as used in supermarket checkout counters, or for hand-held scanners or wands used at similar fixed locations. However, when the bar code reader is to be used by a person who is moving about a building, or when temporary installations are employed, physical wiring is unsuitable, or is at least quite inconvenient. A radio frequency (RF) link can be used to send data from the a hand-held bar code scanner to a central station, or to a local relay point, but the RF links that have previously been available for this purpose have had characteristics making them expensive and inconvenient. These RF links typically have used RF bands requiring F.C.C. licensing for each installation, adding to the cost and administrative burden. The RF components employed in this type of equipment have to be of high precision so that frequency drift and bandwidth spillage are kept within F.C.C. tolerances. In addition, battery drain has required either large, heavy batteries, or frequent recharging, or both. The RF transmission methods previously used also have limited the number of portable terminals which could be used in a given area due to use of a relatively narrow bandwidth. Examples of bar code readers using local RF data links include portable terminals commercially available from the following companies: MSI Data Corporation, Vectran Corporation, LXE Corporation, Norand Corporation, and Telxon Corporation. Portable bar code readers having long-distance RF links are available from Mobil Data International and from Motorola, Inc. (the KDX1000).

Indoor RF communications networks of the voice type have been proposed, such as that of U.S. Pat. No. 4,789,983 for "Wireless Network for Wideband Indoor Communications", or U.S. Pat. No. 4,639,914 for "Wireless PBX/LAN System".

The remote terminals in these prior systems are addressable at any time, i.e., always activated, so the requirements for power are dictated by this feature. In addition, these prior systems have used RF frequency bands requiring F.C.C. licensing of individual users. For these reasons, prior systems of this type have been too costly and otherwise unsuitable for the present purposes.

Spread spectrum wireless transmission is able to use a band that is designated as an "unlicensed" band by the F.C.C. and so licensing is not a factor, and the use of spread spectrum techniques allows the transmission to be accomplished in a reliable manner even though this band is subject to interference from the many diverse users. In U.S. Pat. No. 4,672,658 for "Spread Spectrum Wireless PBX", a system is shown in which each separate user transceiver is matched with a separate transceiver at the central PBX, and each one of these matched pairs transmits with a unique direct sequence spread spectrum chipping pattern. A separate call set-up transceiver having a common direct sequence chipping pattern is used for exchanging information involved in setting up a call. As above, this system requires continuous monitoring of the RF bands by all of the transceivers, and is a voice oriented system requiring varying time periods of maintaining connections, as well as requiring connection from user to user, rather than user to central station. Another example of use of spread spectrum in a local RF link is a utility meter reading system wherein a utility truck driving by a house activates a reader by a CW transmission then receives the data from the reader.

Wireless data communications between a central computer and several remote terminals located within a building, using direct-sequence spread-spectrum techniques to overcome multipath interference, is described by Freret et al, NTC Record, November, 1980, but again these types of systems rely upon continuous operation of the portable units, and impose burdens on the RF circuitry in the remote units which result in complex and expensive construction.

In U.S. Pat. No. 4,740,792 a data transmission system using spread spectrum RF is illustrated wherein vehicles are provided with a transmitter, but no receiver, and the location of each vehicle is reported to a central station periodically by a transmitted packet. The transmitter is powered up only for a very limited duty cycle, so battery drain is minimized. This system has no ability to send data from a central station to one of the vehicles, or to allow the transmitter at the vehicle to receive an acknowledge signal indicating receipt of the data transmitted.

It is an object of the present invention to provide an improved, low-cost, low-power, data communication network in which a number of remote terminal units are able to send packets of data to a central station, and, in most cases, to receive acknowledge signals and data from the central station, preferably a network using an RF link or the like so that the remote units may move about freely in an area to be covered by the network. Another object is to provide an improved packet transmission network in which remote terminal units may be of low cost, low power and small size, yet provide reliable and fast response, as may be needed in a commercial facility (usually indoor) using bar code scanners or the like for data gathering. Another object is to provide an improved protocol for use in a packet data transmission network which results in reliable operation, low power consumption and low cost implementation. A particular object is to provide an RF data link for portable terminals usable without site licensing under F.C.C. regulations, so that the expense and delays incident to such licensing are eliminated or minimized.

SUMMARY OF THE INVENTION

In accordance with one embodiment of the invention, a packet data communication system includes a number of remote terminal units for gathering data, and a communications link for sending packetized data to a central station and for receiving an acknowledge signal and data from the central station. A packet-exchange protocol is used for this communications link that provides reduced power dissipation at the remote unit by activating the receive function for only a short time, rather than requiring the remote unit to receive or "listen" at all times. To this end, the exchange protocol establishes a rigid time window keyed to a transmission by the remote unit, and the remote unit is responsive to a message from the central station only during this time window. The time window is defined to begin at a fixed time delay after a transmission from the remote unit to the central station; at all other times, the receiver is not powered up. In this protocol, the central station cannot initiate a packet transmission to a remote unit, but instead must wait until the remote unit has sent a transmitted packet, then the central station can reply in the rigid time window, attaching to the acknowledge signal the data it wishes to send to this remote unit. The remote units are low-cost, hand-held units in one embodiment, and so will be of lesser computational capacity than the central station, and power dissipation must be minimized. Accordingly, use of this protocol permits the receive function, and the computation function needed to decode received data, to be scheduled or managed by the remote unit rather than being slaved to the central unit.

In an illustrative embodiment, the central station includes a number of base stations located in different rooms or areas, with all of the base stations connected to a central computer, either by a wire connection or by a similar RF link. At any given time, a remote unit is assigned to only one of these base stations, and as the remote unit moves about it is reassigned to another base station. A feature of the protocol is to include an ID number for the remote unit in the transmitted packet, and to include this same ID number in the reply packet, so acknowledgement by an assigned base station is confirmed. But there need be no address or ID of the base station included in the protocol for communicating with the remote units, since a remote unit is assigned to only one base station, and the base station merely serves as a conduit for communicating with the central computer in any event.

The remote terminal units are, in one embodiment, hand-held bar code readers, and these units are coupled to the central station by an RF link so that the user is free to move about the area of the network. Usually the data packet being sent from the remote unit is the result of scanning a bar code symbol. The reply from the central station in this case would be a validation of the bar code information, or instructions to the user about what action to take regarding the package scanned by the hand-held unit.

In a preferred embodiment the RF link employs a spread spectrum modulation technique to send data packets from the remote terminals to the base stations and return. Spread spectrum methods utilize a transmitted bandwidth much wider than required for the data by adding some coded function to the data, then the received signal is decoded and remapped into the original information bandwidth. A particular advantage of this type of RF data link is that a band may be used which does not require site licensing by the F.C.C., yet it provides reliable, low cost communication from a light-weight, hand-held, battery-operated unit.

An important feature in one embodiment is the use of the decode of an initial sync portion of the packet in the direct-sequence spread spectrum transmission to produce a quality factor for use in determining which base station should handle which remote unit. The spread-spectrum transmission contains considerable redundancy (each bit is spread to produce a number of bits), and so a received packet can be used even if in a noisy environment where all decoded bits (before despreading) are not valid. By recording the degree to which the incoming packets from a remote unit correlate with the pseudo-random code used to generate the spread-spectrum signals, and comparing this data with that received at other base stations, the best station can be selected while communications continue uninterrupted.

In order to synchronize the remote receiver with the pseudorandom number sequence of an incoming packet, without requiring searching for the beginning of the sequence over a long period of time, the receiver is made responsive only during a very narrow window, according to one embodiment. This window may be adjusted in reference to a beginning time for an exchange by detecting the actual starting time for the return packet in one exchange and using this detected time to set the window for the next exchange. A method of setting the start time at a receiver may include requesting the base station to send a test pattern (repeating characters) and using this test pattern to try several sequence timings to select the optimum point, then using this starting time for subsequent exchanges.

When differences in the clock frequencies of the base station and remote units are enough to cause tracking difficulties, a timing synchronization technique may be used for avoiding this. According to an embodiment of the invention, this timing synchronization uses a phase-locked loop or the like to adjust both the base station phase and frequency to that of the remote unit during the beginning of an incoming packet at the base station. Because there is no way to predict when a packet will be received at the base, this circuitry is energized at all times, and it must function rapidly to acquire synchronization. The base station then maintains this frequency and phase adjustment during the entire time it is receiving the packet; in this arrangement, there is no inherent limitation to the length of the packet, as would be true if phase errors were allowed to accumulate. After receipt of a packet is completed, the base station begins transmitting an acknowledgement to the remote terminal, and because the timing in the base station has been adjusted to be identical in frequency and phase to the packet it received from the remote, it is a simpler task to adjust the phase since the frequency is already matched. The primary responsibility is thus placed on the base station; the remote terminals, which are greater in number, are compact, and operate on battery power, are thus relieved of most of the responsibility for timing synchronization—the complexity required for rapidly acquiring and maintaining timing synchronization is placed in the single base station, allowing the terminals to remain uncomplicated in this regard. An alternative embodiment, if long base-to-remote packets are desired, is to provide the ability in the remote terminal to adjust its local reference frequency to slowly track the frequency of the received packet signal to account for drift in the base station frequency. This is not a complex task since the received packet signal starts at the remote station's frequency as it existed at the end of its transmitted packet.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 1 is an electrical diagram in block form of a packet data communication system according to one embodiment of the invention;

FIG. 2 is timing diagram showing events (RF transmission) vs. time for a data transmission sequence in the system of FIG. 1;

FIG. 5 is a sectional view of a hand-held bar code scanner unit which may be used as the remote terminal according to one embodiment of the invention;

FIG. 5a is a pictorial view of another type of bar code reader which may be used as the remote terminal instead of the laser scanner of FIG. 5, according to another embodiment of the invention;

FIG. 6 is a view of a part of a bar code symbol to be read by the remote unit of FIGS. 4 and 5, or of FIG. 5a, and a timing diagram of the electrical signal produced thereby;

FIG. 7 is an expanded view of part of the timing diagram of FIG. 2;

FIGS. 7a–7d are timing diagrams similar to FIGS. 2 and 7 for a system as in FIGS. 1, 3 and 4 according to alternative embodiments of the protocol of the invention;

FIGS. 8a–8c are timing diagrams showing events vs. time occurring in the system of FIGS. 1 and 3–6 using the protocol of FIGS. 2 and 7;

FIG. 9a is an electrical schematic diagram as in FIG. 9, according to an alternative embodiment;

FIG. 13 is a timing diagram like FIG. 2 showing an adjustment for synchronization with the pseudorandom number sequence, according to another embodiment;

FIG. 14 is a timing diagram as in FIG. 13, showing timing for a received using the features of FIG. 13; and FIG. 15 is a timing diagram as in FIG. 13 for another embodiment of the synchronizing methods of the invention.

DETAILED DESCRIPTION OF A SPECIFIC EMBODIMENT

Figure 4:
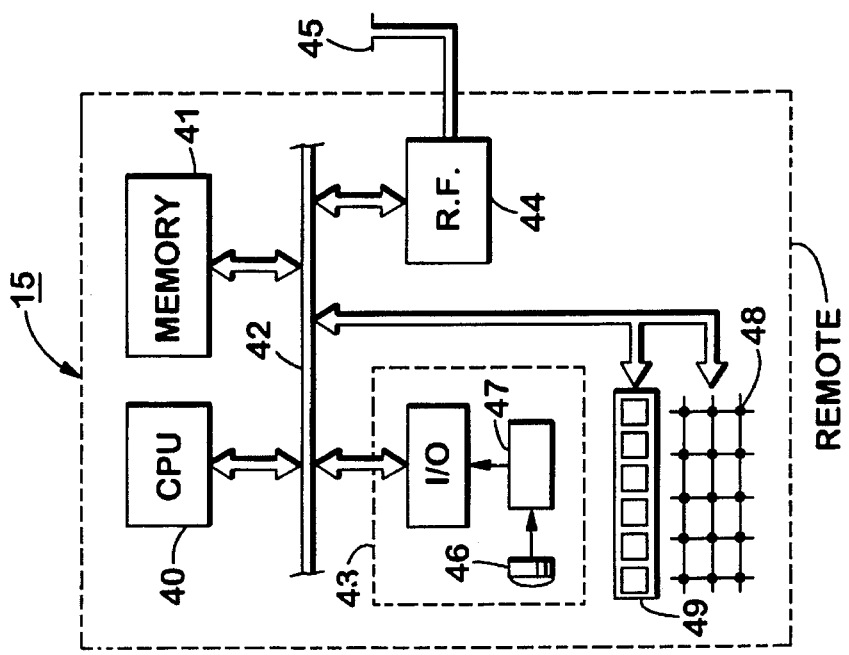
FIG. 4 is a more detailed electrical schematic diagram in block form of one of the remote terminals in the system of FIG. 1.

Referring to FIG. 1, a data communications network according to one embodiment of the invention is illustrated. A host processor 10 is connected by a communications link 11 to a number of base stations 12 and 13; other base stations 14 can be coupled to the host through the base stations 12 or 13 by an RF link. Each one of the base stations 12, 13 or 14 is coupled by an RF link to a number of remote units 15. In one embodiment, the remote units 15 are laser-scan bar-code readers of the hand-held, battery-operated type as disclosed in U.S. Pat. Nos. 4,387,297, 4,409,470 or 4,760,248, all assigned to Symbol Technologies, Inc., for example. Various other types of remote terminals may be advantageously employed in a system having features of the invention; these remote terminals ordinarily would include data entry facilities such as a keyboard or the like, as well as a display (or printer) for indicating to a user information detected, transmitted and/or received by this terminal 15. In this embodiment used as an illustrative example, there may be from one up to sixty-four of the base stations 12, 13 and 14 (three being shown in the Figure), and up to several hundred of the remote units 15; of course, the network may be expanded by merely changing the size of address fields and the like in the digital system, as will appear, but a limiting factor is the RF traffic and attendant delays in waiting for a quiet channel. This communications network as seen in FIG. 1 would ordinarily be used in a manufacturing facility, office building complex, warehouse, retail establishment, or like commercial facility, or combination of these facilities, where the bar code readers or similar data gathering terminals 15 would be used for inventory control in stockroom or receiving/shipping facilities, at checkout (point of sale) counters, for reading forms or invoices or the like, for personnel security checking at gates or other checkpoints, at time clocks, for manufacturing or process flow control, and many other such uses. Although hand-held, laser-scan type bar-code readers are mentioned, the data terminals 15 may also be bar-code readers of the wand type, and may be stationary rather than hand-held. The device may be of the optical character recognition (OCR) type, as well. Other types of data gathering devices may use the features of the invention, such as temperature or pressure measuring devices, event counters, voice or sound activated devices, intrusion detectors, etc.

According to an important feature of one embodiment of the invention, an RF packet communications protocol between the remote units 15 and the base stations 12, 13 and 14 includes a transmit/receive exchange, referred to hereinafter simply as an "exchange". This protocol is similar to collision-sense multiple-access (CSMA) in that a unit first listens before transmitting, and does not transmit if the channel is not free. As seen in FIG. 2, this exchange always begins with a remote-to-base transmitted packet 17, representing an RF transmission from a remote unit 15 to be received by the base stations within range. The transmitted packet 17 is followed after a fixed time interval by a base-to-remote transmitted packet 18, representing reception by the remote unit 15 of RF information transmitted by the base station servicing this particular remote unit 15. Each of these packets 17 and 18 is of fixed timing; a transceiver in a remote unit 15 begins an exchange at its own initiative by first listening for other traffic for a brief interval $t_0$ (typically 0.3 msec), and, if the RF channel is quiet, starting a transmission at a time of its own selection (asynchronous to any clock period of the base stations or host computer). This outgoing transmission packet 17 lasts for a time $t_1$ as seen in the Figure, and in an example embodiment this period is 4.8 milliseconds. Then at a precise time delay $t_2$ after it started transmission (e.g., 5-msec after the beginning of $t_1$) the transceiver begins listening for the return packet 18 from the base station. The transceiver in the remote unit 15 only responds to receipt of the packet beginning in a very rigid time window $t_3$ of a few microseconds length, and if the packet 18 has not started during this window then anything to follow is ignored. The packet 18 is an acknowledge signal, and also contains data if the base station has any message waiting to be sent. The packet 18 also is 4.8 millisecond in length, regardless of what data is included, if any, so a remote-to-base exchange, including acknowledge, takes about 9.8 msec in the example. The base stations 12, 13 and 14 cannot initiate an exchange of FIG. 2, or initiate any other such transmission to the remote units 15, but instead must wait until a packet 17 is received from the remote unit 15 for which this base station has a message waiting, then the data to be sent is included in the data portion of the return packet 18. For this reason, the remote units 15 are generally programmed to periodically, e.g., about every 500 msec or more, send a packet 17 to the base station with no data except its identifying code (traditionally called a NOP), so that the base station can send any data it has waiting in its memory for relay to this remote unit 15. To prevent another remote unit 15 from starting one of the exchanges of FIG. 2 in the interval just after the transmit packet 17 but before the receive packet 18 has started, time $t_0$, the listening time, is generally chosen to be longer than the time interval between transmit packet 17 and receive packet 18 (0.2 msec in this example). If another remote unit 15 tries to initiate its own exchange it will receive the RF transmission and will back off and try again at least about 10-msec later. In the manner of CSMA protocols, the remote units 15 can be programmed to wait random time delays before retry, to thereby lessen the likelihood of simultaneous retries.

Figure 3:
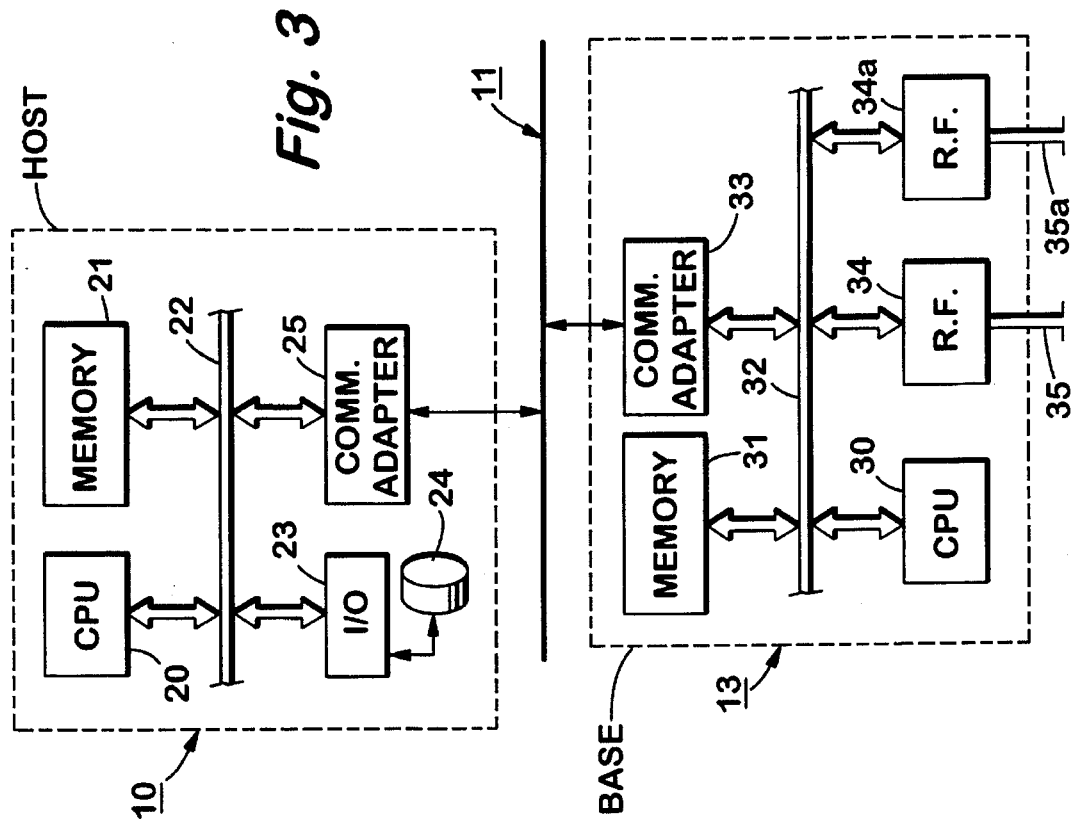
FIG. 3 is a more detailed electrical schematic diagram in block form of the host computer and one of the base stations in the system of FIG. 1.

Referring to FIG. 3, in a typical commercial or retail application of a network of FIG. 1, the host processor 10 maintains a database management system (employing suitable database management software similar to that commercially available) to which the remote units 15 make entries or inquiries via the base stations 12, 13 and 14. The host processor 10 has a CPU 20 which may be a microprocessor device of the 80386 type manufactured by Intel, for example, and the CPU accesses a memory 21 via a main bus 22 to execute instructions. Various I/O processors 23 are used to access peripherals such as keyboard, video display, etc., as well as disk storage 24 for the database system and other computer functions. A communications adapter 25 couples the CPU 20 via main bus 22 to the link 11. This communications link 11 may be of the serial type such as RS232, or in a system designed for higher performance the link 11 may use one of the available local area network type of protocols such as Ethernet or token ring; in the example embodiment, however, the standard local area network protocols are needlessly complex and expensive, and a more optimum solution is merely use of a serial port connected to a shared serial line 11, on a time-sharing basis (e.g., time slotted). The data rate on the link 11 is rather modest compared to typical 4-Mbit or 16-Mbit/sec LAN links of the token ring or Ethernet type; about 160-Kbit/sec is adequate for the link 11, and so one of the various time-slot type of serial link methods may be used.

The base stations 12, 13 and 14 each utilize a CPU 30 which accesses a memory 31 via local bus 32, also seen in FIG. 3. This data processing unit is coupled to the serial link 11 via a communications adapter 33. An RF transceiver 34 is coupled to the CPU 30 in each base station via the local bus 32 and is connected to an antenna 35 for RF transmission to and reception from the remote units 15 using the protocol of FIG. 2. An additional RF transceiver 34a may be used, as well, as an RF link to and from other base stations, if necessary. An example of a commercially-available microprocessor device which may be used as the CPU 30 is a V-25 device manufactured by NEC, which is the same device used in the remote units 15, as described below. Another microprocessor device which may be used as the CPU 30 is the DSP56001 manufactured by Motorola, Inc. of Phoenix, Ariz. This DSP56001 microprocessor is primarily sold as a digital signal processor but also functions as a high-performance, low-cost controller device, capable of executing a 24-bit by 24-bit multiply operation in 100-nsec, and implementing interrupt routines in 200-nsec. Examples of code used to execute typical I/O algorithms and code recognition are available from the manufacturer of the microprocessor devices or associated vendors. The memory 31 includes ROM or EPROM for startup code executed by the CPU 30, as well as fast RAM for the program executed during normal operations and for buffering the digital data incoming from or outgoing to the RF transceiver 34. In addition, the CPU 30 includes a number of fast internal registers used for data manipulation in executing the code recognition algorithms. A particularly useful feature of the 56001 device is that a serial port is available for transmitting and receiving data via the serial communications link 11, so this function can be implemented with little added circuitry in the adapter 33. Likewise, the V-25 device has an analog input which may be used for this purpose; similarly, the adapter 33 may buffer the incoming or outgoing serial data so that parallel transfers on the bus 32 are used for link data.

The base stations 12, 13 and 14 are ordinarily located in various rooms or bays of the commercial establishment containing the network of FIG. 1, or located in other such places not readily accessible to an operator, so usually a console with keyboard and display is not used; if, however, a base station is configured for desktop or wall mounting in an accessible location there may be I/O devices coupled to the bus 32 to allow local data entry or display. The base stations are usually powered by line current rather than being battery operated, and so there is less concern for power dissipation in these devices compared to that for the remote terminals 15. The RF signal path in this environment is changeable in nature as equipment, fork-lift trucks, furniture, doors, etc., are moved about, or as the user moves from place to place and carries the hand-held remote unit with him, or as the network is expanded or reduced in size; there is a high degree of multipathing in this type of RF link. Thus, the particular one of the base stations communicating at a given time with one of the remote units 15 may change; to this end a "hand-off" protocol may be utilized, as will be described, to change the base station which is designated to handle a remote unit. In this manner, a remote unit 15 has a confirmed virtual RF link with only one base station at a time, although others may be in range. The base station 12, 13 or 14 is merely an intermediary; the remote unit is communicating with the host processor 10, and the function of a base station is merely to relay the data from a remote unit to the host computer, or from the host computer to a remote unit. In a minimum-scale installation, there may be only one base station, in which case the communication link 11 may be a direct connection via an RS232 serial port and cable, or, if the building is such that the base station can be mounted at the same location as the host computer, the link 11 may be replaced by a parallel bus-to-bus interface, in which case the base station and host computer may be considered a single unit. When there are multiple base stations, the communications link 11 uses a protocol of adequate performance to allow each RF transmission (packet 17) from a remote unit 15 to be decoded in the base station and relayed to the host processor 10 via the link 11, then a reply sent back from the host computer 10 via the link 11 to the base station, so the base station can wait for another exchange for relay of the stored message to the remote unit 15 in a packet 18. This sequence should appear to a user (a person carrying the bar code reader) as essentially "real time", even though the actual delay may be hundreds of milliseconds. This short cycle is maintained even when the network includes a large number of the remote units 15 operating sporadically. Because of the RF protocol used, and the requirement that the RF link may be shared with a large number of remote units, the serial link 11 is much faster than an RF link via RF transceivers 34a and antennas 35a from one base station to another base station, and so the serial link 11 is used for messages between base stations whenever possible. The RF link is the example embodiment using the protocol as described has a data rate of less than one-tenth that of the serial link 11. Only when the physical layout, or the temporary nature of the network, demands this solution is the RF link from base to base employed.

Referring to FIG. 4, each remote unit 15 in the example embodiment is a data terminal (e.g., a hand-held bar code reader) having a CPU 40 executing instructions from a program and data memory 41 which is coupled to the CPU via a local bus 42. A peripheral bar code data acquisition device 43 is coupled to the CPU via the bus 42 and used to detect and/or convert data from the bar code scanning section to be stored in the memory 41 and processed by the CPU 40; other control devices interface with the keyboard and display. An RF transceiver 44 is coupled to and controlled by the CPU via the bus 42, and transmits the coded RF signal through an antenna 45 or detects and converts RF received by the antenna, according to a protocol. In the example of the remote unit 15 being a laser-scan bar-code reader, the device 43 is used to input data from a photodetector device 46 which produces a serial electrical signal fed to a code recognition circuit 47 responding to the characteristic patterns of bar code symbols and providing bar code data to the memory 41 via device 43 when a bar code is scanned. The bar code data is entered into the memory 41 by DMA if the CPU 40 includes this capability, or by move instructions executed by the CPU; alternatively, the memory 41 may be a video DRAM device allowing serial data entry by a serial port separate from that used for CPU access. The CPU 40 within the remote unit checks the bar code data for validity and format, by executing code stored in the memory 41, and, when the data packet has been prepared in the memory 41, the CPU initiates an RF transmission by activating the RF transceiver 44 and transferring the encoded packet containing the bar code data to the transceiver via bus 42. Usually the remote unit has a manual data entry device such as a keyboard 48, and a visual display 49 such as an LCD device; the elements of the keyboard and display are scanned by signals generated in the CPU 40, or generated in a keyboard and display I/O controller such as an Intel 8052 microcontroller widely used for this purpose, depending upon performance/cost considerations. An advantage of the protocol of FIG. 2, however, is that the CPU 40 can handle all of these tasks, including data input from the bar code scanner, keyboard and display scan, RF control, datastream transfers to and from the RF and data encoding and decoding, because the RF transmission and reception is under control of the remote unit rather than being scheduled by a higher level device such as the base station or the host computer. That is, an important feature is the ability of the remote unit 15 to schedule events and communicate with the base station at times of its own choosing, as this ability simplifies the tasks of the remote unit. Therefore, the components needed in the remote unit of FIG. 4 are kept to a minimum for cost, size, weight and battery life considerations.

The CPU 40 in the remote unit 15 of FIG. 4 may be an Intel 8088 16-bit microprocessor device, having an external bus 42 which includes an 8-bit data bus, an address bus of up to 20-bit width (only about 14-to-15 bit addresses are needed in this example) and a set of control lines. Alternatively, the CPU 40 may be an NEC V-25 microprocessor, which is software compatible with the 8088 but has several added capabilities, such as a serial port, DMA capability, an analog input port, and multiple register sets to speed up context switches, as well as several added instructions. Of course, using a V-25 device for both the CPUs 30 and 40 simplifies the code-writing task since some of the code is used in both base and remote units. The memory 41 may consist of a 128-Kbit EPROM chip and a 128-Kbit static RAM chip, providing 32-Kbytes of memory which is sufficient for the tasks assigned to this unit; of course, additional memory may be added for different tasks or higher performance. Preferably, CMOS devices are used for the CPU 40 and memory 41 (as well as in the RF circuitry 44 where possible) to minimize power dissipation and battery drain. The 8088 or V-25 microprocessor devices are merely examples of the class of CPU device needed in the remote unit, it being understood that other microprocessor devices may be used, although the 8088 device has the advantages of a low cost for the part and for the software; there is available a wide variety of software already in existence for the 8088 device.

Although other data terminal units 15 may be advantageously employed in a system having features of the invention, a hand-held, laser-scan, bar code reader unit as illustrated in FIG. 5 is an example of a remote unit particularly suited for use in the system of FIG. 1. This hand-held device of FIG. 5 is generally of the style disclosed in U.S. Pat. Nos. 4,760,248, 4,806,742 or 4,816,660 issued to Swartz et al, assigned to Symbol Technologies, Inc., and also similar to the configuration of a bar code reader commercially available as part number LS 8100II from Symbol Technologies, Inc. Alternatively, or in addition, features of U.S. Pat. No. 4,387,297 issued to Swartz et al, U.S. Pat. No. 4,409,470, issued to Shepard et al, U.S. Pat. No. 4,808,804, issued to Krichever & Metlitsky, or U.S. Pat. No. 4,816,661, issued to Krichever & Metlitsky, such patents assigned to Symbol Technologies, Inc, may be employed in constructing the bar code reader unit 15 of FIG. 3. These U.S. Pat. Nos. 4,816,661, 4,816,660, 4,808,804, 4,806,742, 4,760,248, 4,387,297, and 4,409,470 are incorporated herein by reference. A outgoing light beam 51 is generated in the reader 15, usually by a laser diode or the like, and directed to impinge upon a bar code symbol a few inches from the front of the reader unit. The outgoing beam 51 is scanned in a fixed linear pattern, and the user positions the hand-held unit so this scan pattern traverses the symbol to be read. Reflected light 52 from the symbol is detected by a light-responsive device 46 in the reader unit, producing serial electrical signals to be processed for identifying the bar code. The reader unit 15 is a gun-shaped device having a pistol-grip type of handle 53, and a movable trigger 54 is employed to allow the user to activate the light beam 51 and detector circuitry when pointed at the symbol to be read, thereby saving battery life if the unit is self-powered. A light-weight plastic housing 55 contains the laser light source, the detector 46, the optics and signal processing circuitry, and the CPU 40 and RF transceiver 44 of FIG. 2, as well as a battery. A light-transmissive window 56 in the front end of the housing 55 allows the outgoing light beam 51 to exit and the incoming reflected light 52 to enter. The reader 15 is designed to be aimed at a bar code symbol by the user from a position where the reader 15 is spaced from the symbol, i.e., not touching the symbol or moving across the symbol. Typically, this type of handheld bar code reader is specified to operate in the range of perhaps several inches.

As seen in FIG. 5, a suitable lens 57 (or multiple lens system) is used to collimate and focus the scanned beam into the bar code symbol at the proper depth of field, and this same lens 57 may be used to focus the reflected light 52. A light source 58 such as a semiconductor laser diode is positioned to introduce a light beam into the axis of the lens 57 by a partially-silvered mirror and other lenses or beam-shaping structure as needed, along with an oscillating mirror 59 which is attached to a scanning motor 60 activated when the trigger 54 is pulled. If the light produced by the source 58 is not visible, an aiming light may be included in the optical system, again employing a partially-silvered mirror to introduce the beam into the light path coaxially with the lens 57. The aiming light, if needed, produces a visible-light spot which is scanned just like the laser beam; the user employs this visible light to aim the reader unit at the symbol before pulling the trigger 54. The electronic components of FIG. 4 are mounted on one or more small circuit boards 61 within the housing 55 of FIG. 5, an batteries 62 are enclosed to provide a self-contained portable unit. The antenna 45 may be printed on one of the circuit boards 61.

Referring to FIG. 5a, another embodiment of a remote terminal 15 is illustrated wherein a wand-type bar code reader is employed instead of the laser scanner of FIG. 5. This device of FIG. 5a is similar to a commercially-available portable radio terminal sold under the product name "MSI PRT" by MSI Data Corporation, of Costa Mesa, Calif., a subsidiary of Symbol Technologies, Inc, the assignee of this invention. The keyboard 48 and display 49 are mounted at the face of a hand-held housing 63, and the light source 58 (in this case an LED, for example) and light detector 46 (not seen in FIG. 5a) are mounted within a pencil-shaped wand 64 connected to the housing 63 by a cable. The person using the device of FIG. 5a holds the housing 63 in one hand and the wand 64 in the other, and moves the wand 64 across the bar code symbol, in contact with the symbol, instead of holding the unit steady (spaced from the symbol) and relying upon the oscillating mirror to generate the scan of the symbol as is the case for the FIG. 5 embodiment. Otherwise, the device of FIG. 5a contains the circuitry of FIG. 4, and the RF link operates in the same way.

Referring to FIG. 6, a part of a typical bar code symbol 65 is illustrated of the type read by the laser scanner of FIG. 5, or by the wand-type reader of FIG. 5a. In the case of a laser scanner, the laser scan beam 51 produces a scan line 66, and reflected laser light 52 detected by the photodetector 46 and shaped by the circuitry 47 produces a binary electrical signal 67 as also seen in FIG. 6. Or, in the case of a wand-type reader, the wand is moved along the line 66 and reflected light is detected to produce the same type of binary signal 67. Of interest are the transitions 68 in the signal 67 representing passage of the beam or light between light and dark areas or bars and spaces in the symbol 65 (dark produces a binary "0" and light a binary "1" in the illustration). A bar code symbol can be distinguished from other images by the spacing between transitions 68 as a function of time, or similar patterns of the signal. These distinguishing features can be checked by the code executed by the CPU 40 after the data is loaded to the memory 41. One data format used to load bar code data to the memory 41 is a sequence of numbers corresponding to the time between transitions 68. The bar code symbol 65 of FIG. 6 usually includes start and stop characters, and often a check sum is included in the encoded data, so the validity of the bar code symbol as read may be readily checked by the code executed by the CPU 40 when the data is in the memory 41.

In a typical operation, a user may be located in a receiving or stock room of a commercial or industrial establishment, where this user would aim the remote unit 15 of FIG. 5 at a bar code symbol 65 of FIG. 6 on a package of interest and pull the trigger 54. This trigger pull initiates a scan operation wherein the laser diode 58 is activated, the scanning motor 60 is energized to oscillate the mirror 59, the detector 46 is powered-up, and so bar code data is produced for entry to memory 41 via the data acquisition circuitry. Alternatively, of course, using a wand of FIG. 5a, the user would actuate the reader and move the wand 64 across the bar code symbol. In either case, this bar code data is loaded to memory 41 then the data may be processed to check for validity using routines executed by the CPU 40, and if valid then a data packet is defined in the memory 41 according to the protocol as will be described, then the RF transceiver 44 is activated by a command sent from the CPU 40, the encoded data packet is loaded to the transceiver 44 from the memory 41 in a sequence of bytes, and an RF transmission according to FIG. 2 is initiated, i.e., listen during $t_0$ then transmit a packet 17 if quiet. The base station 12, 13 or 14 receives the RF transmission packet 17 from the remote unit 15, decodes it on the fly, checks for errors, sends an RF acknowledge signal packet 18 to the remote unit 15 during the precise time window, and reformats the data in memory 31 by instructions executed by the CPU 30 for sending to the host computer 10 via communications link 11. The packet 17 from the remote unit 15, or the acknowledge packet 18 from the base station, may contain instructions about when the remote is to initiate another exchange to get the answer to its inquiry. After receiving the data relayed by the base station, the host computer 10 performs whatever database transaction is needed, then sends a response back to the base station via link 11, which the base station holds in memory 31 for sending to the remote unit 15 when another exchange occurs using the protocol of FIG. 2 and as described below. When the remote unit 15 has received the data sent by the host computer in response to its inquiry (relayed via one of the base stations), some indication may be displayed to the user by the LCD display 49 on the hand-held unit of FIG. 5, or of FIG. 5a. For example, the data sent from the host computer 10 may tell the user of the remote unit 15 to take some action with respect to the package which had the bar code symbol on it just read by the trigger pull, i.e., place the package in a certain bin, etc. For this type of operation, the response time from trigger pull to the answer appearing on the display 49 should be short enough as to be hardly noticeable, e.g., one second or less.

The type of operations as just described place several requirements upon the system. First, the remote units should be relatively light in weight and small in size, and of course should not require a wire connection to the central station. Battery operation is thus dictated, but the batteries should not have to be large or heavy, and frequent recharging is to be avoided. Line-of-sight communications, as by an infrared link, are inconvenient in this environment because of obstructions and restrictions in field of view, so RF is preferred. An RF link often imposes the burden of F.C.C. regulations, both for restrictions on the equipment and components employed and frequency bands used, but also for licensing of individual users or sites. The effects of these requirements are minimized as will be seen.

A more detailed view of the contents of transmitted packets 17 or 18 is seen in FIG. 7. The two packets 17 and 18 are the same in general format, so only one is shown. A packet 17 begins with a start signal 72 of fixed length which is used to give notice to the receiver that a packet is beginning and also to synch the receiver; in addition the start signal may be coded so that only base stations and remote units for this particular network will respond (there may be overlapping networks owned by different businesses). Next, a 3-byte header 73 is sent, and, as seen in the expansion view, the header contains a 13-bit device-identification field 74 or "handle"; each remote unit 15 also has a serial number of 24-bit length so no two remote units 15 need ever be manufactured having the same serial number, but to save needless transmission of data this field 74 is shortened to a 13-bit handle, allowing $2^{13}$ or 8192 remote units to be on one network with unique handles. This handle is given to the remote unit 15 during an initialization or power-up procedure when the remote unit is connected to a base or host by a direct cable. After the device-ID field 74, the header 73 includes a 5-bit "size" field 75 which says how many bytes of data are to follow, the permitted size being from zero to twenty-two bytes of data. Thus a "byte count" type of protocol is used, as has been used in previous packet-type serial communications protocols. The 5-bit "size" field 75 allows $2^5$ or thirty-two codes to be sent, but only twenty-three are needed for conveying the size information, so if no size information need be sent in a given packet then other commands or messages can be sent in this field, such as a NOP for merely signalling presence of a remote unit or for allowing the base station to send back data if any is waiting. Next, the header 73 contains two 3-bit fields 76 and 77 representing the record number and acknowledgement number, respectively; if an amount of data exceeding 22-bytes must be sent (as when downloading code from the host computer 10 to a remote unit 15 for execution by the remote's CPU 40 when changing operating modes, for example), then this data is split into 22-byte packets which are numbered consecutively, counting modulo-8, and each must be acknowledged by number. In the usual bar code reading transaction, the packets 17 and 18 will be of 22-bytes or less, so the function of the record and acknowledge counting will be of less importance. Following the header 73, a data field 78 of 0-to-22 bytes is transmitted, and a CRC field 79 concludes the packet. The CRC field contains a calculated function of all the bits of the header field 73 and data field 78 for CRC checking; if the receiving device (remote unit 15 or base station) receives a packet 17 or 18 but the CRC calculation of what is received does not agree with the CRC field 79 received, the packet is discarded and not acknowledged, so it will be resent by the transmitting device after a timeout period. As illustrated in FIG. 7, the portion of a packet 17 or 18 after the start symbol 72 is from seven to twenty-nine bytes long; if data to be sent exceeds 22-bytes, then a code can be included in the field 75 (a value above twenty-three) to indicate more is coming.

The remote unit 15 does not have to execute extensive computations while it is either transmitting or receiving packets 17 or 18. Instead, the packet 17 is completely made up in the memory 41 before the transceiver 44 is activated, then during the fixed receive window for the packet 18 the incoming data is merely copied to the memory 41 without interpretation, so all decoding or computation is done after the exchange. This remote unit need not be concerned about receiving any further messages from a base station until the remote unit is ready. The remote unit 15 manages or schedules its own packet communication operations, instead of being a slave of the host or base stations. The base stations 12, 13 and 14, on the other hand, must be ready to receive one of the exchanges of FIG. 2 at any time, so the transceiver 34 must be activated at all times, then when a packet 17 is received it must be immediately decoded, checked, acknowledged by a packet 18, and data sent on to the host computer 10; when a reply message is sent back to this base station from the host computer 10 it must be formatted and stored in memory 31 ready to send back to the remote unit 15 when another exchange of FIG. 2 is initiated by that remote unit 15. During this time, packets 17 may be received from other remote units, and these must be acknowledged with a packet 18 at the 5-msec timing of FIG. 2. Accordingly, the base stations have a much greater computation burden imposed upon the CPU 30, compared to the CPU 40 in a remote unit, and the RF transceiver 34 must operate continuously and recognize incoming signals at any time rather than being off most of the time. The transceiver 34 cannot merely save the received data in memory then shut itself off (the data being evaluated later by the CPU), as is done in the remote units 15.

The standard protocol represented by the exchange of FIG. 2 using the packets of FIG. 7 is best for short interactive messages of the type routinely encountered in bar code reading, but this standard protocol does not handle transfers of large amounts of data very efficiently. When a large block of data is to be transmitted using the standard protocol the data must be broken into 22-byte segments and a separate exchange of FIG. 2 implemented for each segment. There will now be described three alternative modes or extensions to the protocol to address the issue of block data transfers: a "variable length exchange" for exchanging data with a single remote unit 15, a "broadcast mode" for broadcasting to several remote units 15 at the same time, and a "fixed-time broadcast mode" for sending blocks of data from the host to the remote units. These alternative modes use the same circuit and system construction as disclosed above, but may use more memory in the remote unit memory 41 and the base unit memory 21. Also, it may be noted that units having these three alternative modes may be used in a network mixed with units not supporting these modes, in which case the modes will be merely inoperative and the network will operate with the standard protocol without the extensions (i.e., downward compatibility is provided, rather than the entire protocol being unworkable when units are mixed).

As described above, in the standard protocols used for the link 11 and the RF link, data flow between an application program being executed in a remote unit 15 and an application program executing in the host computer 10 is always in the form of messages, where a message consists of 0-to-512 bytes of data of arbitrary value. If a message is 0-to-22 bytes, it is sent as a single packet 17, with the packet type defined in field 75 as type-0 through type-22, according to the number of bytes in this message. If the message is longer than 22-bytes, it is broken into a sequence of packets 17, the last of which is type 1-to-22 and contains 1-to-22 bytes; the others are all type-23 and contain 22-bytes each. For a given direction of data flow, e.g., remote-to-base, only one packet may be sent per exchange of FIG. 2. Up to four packets may be sent in one direction without retransmission before acknowledgement from the other end, and these are signaled in the record number and acknowledgement number fields 76 and 77 of the packet of FIG. 7. That is, a remote unit 15 sends four of these sequential packets before resending the first one if no acknowledgement packet has been received from the base station.

As an alternative to this standard protocol, first, a variable-length exchange between a base station 12, 13 and a single remote unit 15 will be described. Referring to FIG. 7a, according to one alternative, an extension to the standard protocol is to allow up to four packets 17 to be sent in one exchange. A type-25 packet indicated by the field 75 is defined to mean a continuous flow of up to four packets. For instance, if a remote unit 15 has in its memory 41 ready to be transmitted two type-23 packets 17a and 17b, and a type-15 packet 17c, it temporarily renames the type-23 packets to type-25 packets, meaning a continuous flow of up to four packets are in this group. When it then initiates an exchange, it sends the type-25 packets 17a and 17b followed by the type-15 packet 17c and then listens for the response packet 18 from the base station. Each of these transmitted packets 17a, 17b and 17c uses a full 5.0 milliseconds (excess time filled with nulls) to allow the base station some time from the end of one packet to the beginning of the next to realize that it is not yet time to respond. The transmitter 44 of the remote unit 15 remains on for the full 15-milliseconds of packets 17a–17c for CSMA purposes. The base stations can also send type-25 (continuous up to four) packets to the remote units. If the base station is sending multiple packets to the remote as illustrated in FIG. 7b, it can send these packets 18a, 18b and 18c one right after the other (3.6 milliseconds apiece) since the remote unit 15 is merely storing them in memory 41 for later processing by the CPU 40. Of course, the remote unit must preallocate enough of the memory 41 to absorb up to four packets and keep its receiver 44 on for a long enough time. If a very long string of type-23 (22-byte) packets are to be sent, each exchange can handle up to four packets, the last of which is a type-23 and the others being type-25. Except for the purpose of the exchange, there is no difference between type-23 and type-25. Since the server or host 10 is not involved with exchanges, the program executed by the CPU 20 does not have to take into account type-25 packets at all. The programs executed by the CPUs 30 and 40 are responsive to receipt of a field 75 exhibiting a type-25 code in order to extend the time for listening by RF transceivers 34 or 44, or responding by RF transceiver 34.

Referring to FIG. 7c, the "broadcast mode" will be described. There are situations where a large amount of data is to be moved, such as when downloading price lists or new programs from the host 10 to the remote units 15, and for this purpose an alternative protocol with a large window size may be implemented. This situation is normally asymmetric (while a download is in progress, the remote has little information to send to the host, except acknowledgements), and is usually in the direction of host-to-remote. The "variable length" alternative protocol of FIGS. 7a and 7b handles large data blocks in bursts of four packets, with each four packets requiring an acknowledge packet, which slows down the overall data rate for a large block. Thus, as seen in FIG. 7c, an alternative "broadcast mode" protocol is provided in which the return packet 18 is expanded to a large number of packets 18a–18n; a packet type (type-26) is assigned to this broadcast window mode to be indicated by the field 75; the acknowledge and packet number fields 76 and 77 of FIG. 7 are concatenated to form a six-bit packet number field 76a in the header of each one of the packets 18a–18n as seen in FIG. 7c. The remote unit 15 sends a special acknowledge packet 17 after every thirty-two packets 18a–18n it receives. This special acknowledge packet 17 (type-27) will have an extra byte in the data field 78 to contain the six-bit acknowledgement number. The host 10 will not explicitly acknowledge these special acknowledge packets it receives (via base stations) from the remote unit; instead the acknowledgement will be implied by the fact that the packet numbers continue to advance. Note that the base stations are not involved in this alternative protocol (except of course as a vehicle to transmit and receive the packets as before) since they are not concerned with remote windows; if the host 10 sends to the base stations a packet containing a type-26 in the field 75, then the base stations send it out as such on the next exchange initiated by the remote units, then wait for a type-27 response after the last packet 18n and send this response on to the base 10. This broadcast mode of FIG. 7c is implemented independently of the variable length mode of FIGS. 7a and 7b.

Another alternative mode of operation which may be added to the protocol is referred to as the "fixed-time broadcast mode", and is useful when many remote units are to be given the same information at the same time, such as a new price list or software. If these remote units are stationary and served by a single base station for a minute or so, the base station can transmit to all of the remote units 15 simultaneously. Since the remote units cannot scan for packet headers in real time (i.e., are in the receive mode only after sending a packet 17), it must be insured that each remote unit 15 knows precisely when the next packet 18 is coming.

Assume that the host 10 is to do a fixed-time broadcast from a base station and that the remote units 15 initiate an exchange of FIG. 2 every ten seconds to "check in". The host 10 will pick a time at least ten seconds in the future when the fixed-time broadcast is to begin, and inform the base station of this selected time $T_f$ of FIG. 7d. When each remote unit initiates an exchange by packet 17 of FIG. 7d to check in, it will be informed in the acknowledge packet 18 of the selected time $T_f$ of the beginning of the broadcast, and also of the total number of bytes and packets in that broadcast. The remote unit will allocate the memory 41 for broadcast reception and mark time until the broadcast begins at $T_f$.

At the designated time $T_f$, the base station will transmit a burst of sixteen consecutive packets 18', without a packet 17 to begin the transmission, as seen in FIG. 7d. The transmission time for the sixteen packets 18' is 62.6 milliseconds. The first five milliseconds of transmission are a field 72' of random chips to allow for the possibility of a nonparticipating remote unit 15 attempting an exchange just after $T_f$ at the beginning of the transmission. The normal CSMA logic should prevent remote units from attempting exchanges during the rest of this transmission; any attempted exchange by another remote during the transmission time should fail.

Following the transmission of the sixteen packets 18' will be period of time $T_i$ before the next transmission. The time period $T_i$ must be precise so that the remote units know precisely when the next broadcast transmission will occur. It must be long enough for the slowest of the participating remotes to completely digest the previous transmission, and this will be from perhaps 15-to-100 milliseconds, depending on the speed of the remote processor 40. In no case should it be less than 15-milliseconds, otherwise conventional exchanges from both participating and nonparticipating remote units would be shut out. Another consideration is that the base station must have another sixteen packets ready to go before the next transmission time. If there is a bottleneck anywhere between the host 10 and the base station, the intertransmission time period $T_i$ must be long enough to allow for it.

Since each remote unit knows the total number of packets in the broadcast before the fixed-time broadcast of FIG. 7d begins, it knows when the broadcast is finished. It also knows when each packet 18' was supposed to have been transmitted, and can keep a list of which packets it did not receive. Note that the broadcast windowing scheme of FIG. 7c does not apply here, since the broadcast windowing scheme implies a unique full duplex data path between each remote and the server. When the fixed-time broadcast of FIG. 7d is complete, each remote unit 15 will report in with the normal exchange mechanism. If the number of packets to be retransmitted is large, or if some packets need to be sent to more than one remote unit, the host 10 can set up another fixed-time broadcast to do this. Otherwise, the standard protocol will be used for the cleanup.

The fixed-time broadcast mode works best when all participating remote units can be reached from a single base station. This is always the case if there is only one remote unit. If the remote units are spread out among several base stations, the broadcast will have to be repeated for each base station. As an alternative construction, a third RF transceiver 34 is added to each of the base stations, or if normal exchanges were suspended, each base could use a separate frequency and do the broadcasts in parallel, but this would compromise the above mentioned design philosophy.

Another consideration is that the base station doing the broadcast should have an efficient connection to the host 10 by the link 11, either direct or coaxial. If the base station is several RF hops from the host 10, the bandwidth through the network of base stations will be a severe limiting factor.

Assuming a fixed-time broadcast mode transmission every 80-milliseconds, which is 62.6 milliseconds for the transmission and 17.4 milliseconds between transmissions, the data rate will be 12.5*22*16 or 4400 bytes per second. It would take three minutes and 47-seconds to broadcast a full megabyte at this rate.

The spread-spectrum RF transmission used in a preferred embodiment for the RF link between remote units and base stations will be described according to one feature of the invention.

The RF transmission method used for the packets 17 and 18 of FIGS. 2 and 7, i.e., all packets or replies sent between remote units 15 and base stations 12, 13 and 14, (or RF communication between base stations if this method is used) utilizes the spread spectrum RF modulation technique, i.e., the transmitted signal is spread over a wide frequency band, much wider than the bandwidth required to send the digital information in the packets 17 and 18. Reference is made to R. C. Dixon, "Spread Spectrum Systems", published by Wiley & Sons, 1976, for details of design, construction and operation of this type of RF equipment. A carrier is frequency modulated in the transceivers 44 or 34 by a digital code sequence (stored in memory 41 or memory 31) whose bit rate is much higher than the information signal bandwidth. The information signal bandwidth during one of the packets 17 or 18 is only about 60-KHz (29-bytes of data in about 4-msec in this example). But instead of merely transmitting the 29-byte data packet in its straightforward form, the data to be sent is first expanded or spread to replace each single bit of data with an 11-bit set. That is, each binary "1" becomes "11111111111" and each binary "0" becomes "00000000000"; in the remote unit this expansion is done in the memory 41, by a routine executed by CPU 40, or in the base station it is done in the memory 31 by code executed by the CPU 30. The 11-bit-for-one spreading factor is chosen as a compromise of various RF bandwidth considerations and the like; other spreading factors could be used, but the F.C.C. requires at least a ten-to-one spread so this 11-to-1 is about the minimum. In any event, the 29-bytes or 232-bits of data becomes 11×232 or 2552 bits in memory 41, plus the 48-bit start symbol, resulting in a 2600-bit message length (maximum) in memory 41. Next, this expanded data is combined (exclusive-ORed) with a pseudorandom binary code value before being used to modulate the carrier; this binary code value is also stored in the memory 41, and the exclusive-OR logic function used to combine the data and code is implemented by instructions executed by the CPU 40 accessing the memory 41. The pseudorandom binary code value chosen is unique to this network, and may be changed under control of the host computer for security or to avoid crosstalk if other networks are operating in overlapped areas. The length of the pseudorandom binary code value, i.e., number of bits before repeating, must be at least 127-bits according to F.C.C. regulations for spread-spectrum transmission in this band; above this value, the length of the pseudorandom code is chosen depending upon security and computation time constraints, and in this example embodiment a value of greater than 2600 is used so there is no repeat during a message frame. The coded data is applied from the memory 41 to the RF transceiver 44 via the bus 42 in parallel or serial format, and the data is used in the transceiver 44 to modulate a carrier in the FSK manner, i.e., each binary "1" causes a voltage-controlled oscillator to operate at one frequency, and each binary "0" causes the oscillator to operate at another preselected frequency. The band specified by the F.C.C. for this type of unregulated and unlicensed use is 902 to 928 Mhz, so the oscillator uses a pair of frequencies in this band; as required by the F.C.C. these frequencies are at least one-half the baud rate apart. Each "channel" in this example uses about 0.4 MHz bandwidth, and the channels are 1-MHz apart. The spread spectrum modulation technique chosen for this embodiment of the invention may be characterized as "narrow-band direct sequence", in that the bandwidth of the spread is relatively narrow, about 666,667 chips per second rate, where a "chip" is a discrete signal frequency output from either of the transceivers 34 or 44. That is, the RF transmitted frequency is switched between two discrete frequencies, in this case switching (or potentially switching, depending upon the binary data) every 1.5 microsecond, each of these 1.5 microsecond periods being called a "chip". The RF transceivers are able to operate at a number of different carrier frequencies or "channels" within the band of 902–928 MHz (for example, sixteen different carrier frequencies) so that interference on any particular frequency may be avoided by merely changing to a different frequency, but the transceivers will tend to stay on a single frequency for prolonged periods of time when there is no need to change.

Referring to FIG. 8a, the transmitted signal from a remote unit 15 to base station, or return, is seen to be frequency modulated in a manner to switch between two frequencies, but to dwell at one of these frequencies for a period 80 or "chip" of 1.5 microsecond for this example. This signal is detected and demodulated to produce an analog output voltage as seen in FIG. 8b. The demodulation produces a logic "1" whenever the signal is above a threshold 81 (corresponding to one of the frequencies), or a logic "0" whenever the signal is below this threshold (corresponding to the other of these two frequencies). This detected binary signal is sampled at three times the "chip" rate of 666,667 Hz, i.e., sampled at 2-MHz, producing three "sets" of binary strings A, B and C as seen in FIG. 8c. These three sets are loaded to memory 41 in the remote unit 15 for processing after the packet 18 is received, or examined in a high-speed decoder in the base station in real time as the packet 17 starts to come in. Each one of the sets A, B or C, is tried for a pattern fit by being exclusive-ORed with the first 44-chip pattern (which corresponds to the start symbol 72 of FIG. 7) of the same pseudorandom binary code value used for encoding upon transmission, to see if the 44-bit start symbol 72 is present—if so, the immediately-following chips will upon decoding produce 11-bit strings of "1's" or "0's". Note that the 44-bit start symbol is accepted as "good" even if only about 35-of 44 bits or more match, because the probability of 35-of-44 being a valid transmission instead of noise or a crosstalk signal is very high (for random noise, 22-of-44 will be valid, on average). Likewise, the algorithm used to decode and despread the data part of the message frame or packet may be configured to accept less than full 11-bit strings, i.e., if one or two bits are wrong, there is still a high probability that the data is good, and so the string is accepted as a valid bit anyway.

Figure 9:
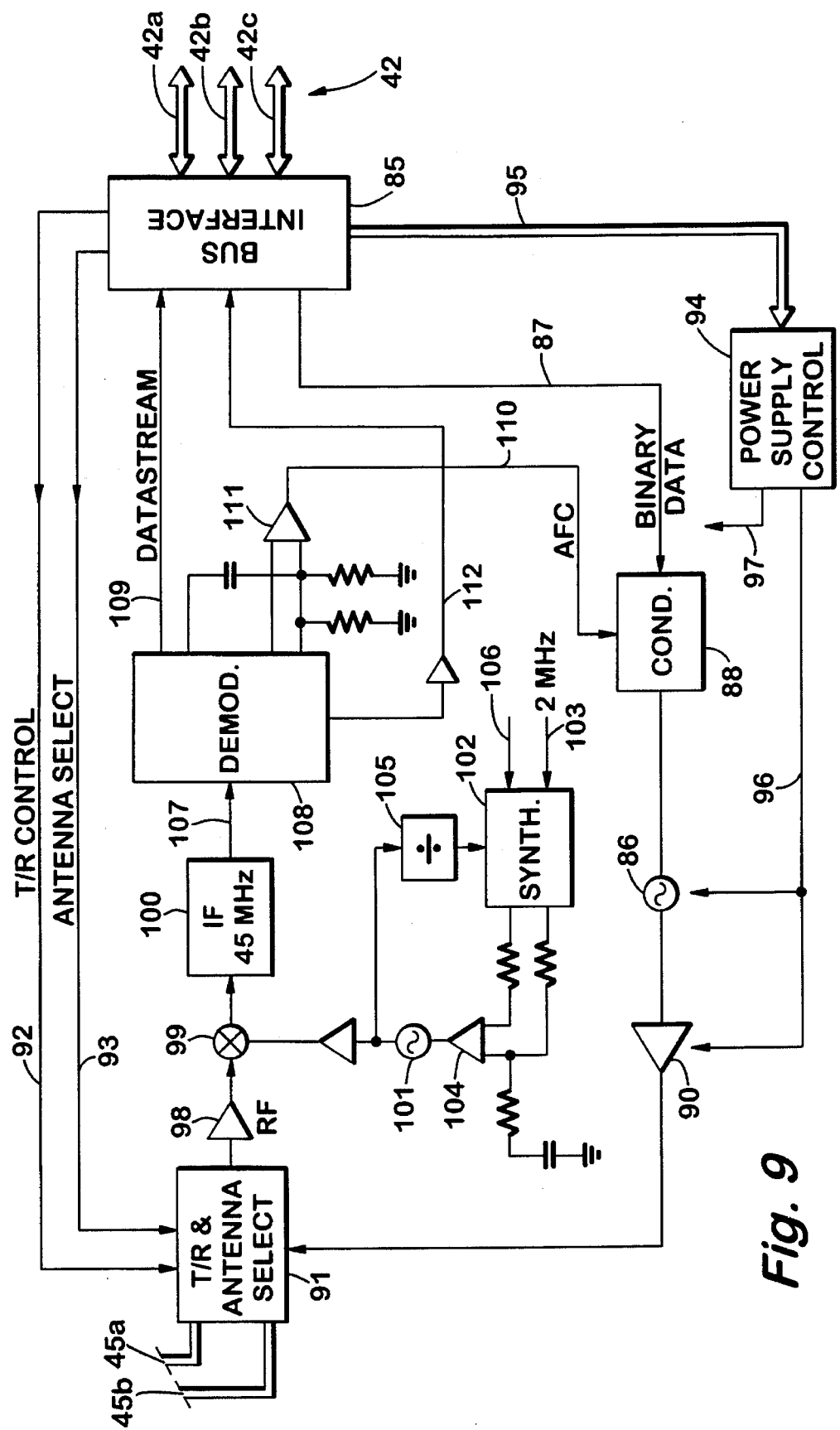
FIG. 9 is an electrical schematic diagram of the circuitry of the transmitter/receiver in the remote unit of FIG. 4.

Referring to FIG. 9, the transceiver 44 in a remote unit 15 is shown in more detail. The transceiver circuitry in connected to the bus 42 by an interface 85 which is connected to an address bus 42a, a data bus 42b and a control bus 42c making up the standard 8088 or V-25 bus 42. The interface 85 contains registers addressable in the I/O space of the CPU 40 to load commands or data to the transceiver 44, or to receive data from the transceiver. The transmitter part of this circuit includes a voltage-controlled oscillator 86 to which is applied serial binary data via line 87 from the memory 41 through the interface 85, using conditioning circuitry 88 as may be required for level shifting. The output 89 of the voltage controlled oscillator 86 is coupled through a power amplifier 90 to a T/R switch and antenna switch 91. This switch circuitry 91 is controlled by a T/R control signal on line 92 and an antenna select signal on line 93 coming from the interface 85. Two printed dipole antennas 45a and 45b are available, so when a transmission fails on one then the other antenna can be tried; the two antennas are positioned in different parts of the housing 55 of the hand-held unit 15, in the example embodiment the antennas are one-quarter wavelength or about 3-inches apart, so, depending upon the environment, one may be found to produce a clear signal when the other does not. I/O instructions executed by the CPU 40 actuate the T/R control and antenna select on lines 92 and 93. A power control 94 is also activated by control lines 95 from the interface 85 (and thus from the CPU 40) to switch on or off the supply voltage going to the transmit circuitry via line 96 or to the receive circuitry via line 97. The transmitter is switched off when not being used to reduce power dissipation, but may be very quickly turned on and brought on line because there are no F.C.C. constraints on spillage in the band used, and the receivers are able to follow the signal by AFC circuitry. The receive circuitry includes an RF amplifier 98, a mixer 99, and an IF amplifier stage 100 filtered at 45-MHz, with the local oscillator being a voltage-controlled oscillator 101 operated by a synthesizer 102 to produce a 947 to 973 MHz frequency (45-MHz above the frequency being used). The synthesizer 102 receives the 2-MHz clock from the CPU 40 via line 103, and generates inputs to a differential amplifier 104 whose output controls the oscillator 101, with feedback from the oscillator output through an appropriate divider 105. The particular frequency of operation is selected in the synthesizer 102 by a binary code loaded to input 106 via interface 85 from the CPU 40. The output 107 of the IF stage 100 is applied to a detector 108 responding to the FSK modulation to produce a serial binary data output on a line 109 corresponding to FIG. 8b, and this data output 109 is applied to the interface 85 to be sampled at 3× the chip rate as explained above to produce the three binary datastreams A, B and C to be loaded to the memory 41. The detector circuit 108 also produces an automatic frequency control or AFC output 110 via differential amplifier 111, and this AFC voltage is fed back to the conditioning circuitry 88 for the voltage-controlled oscillator 86 of the transmitter. Thus, while the transmitter is operating, the receive channel is also powered up to produce the AFC voltage on line 110 to adjust the frequency of the oscillator 86. In addition, the detector 108 produces a voltage on the line 112 representing the signal strength when in the receive mode, and this voltage is available to be read by the CPU 40 at the interface 85; in this way the signals produced by the antennas 45a and 45b can be compared, and the also various available frequencies checked for RF signal levels. This information may be used in an algorithm to select the optimum transmit/receive channel. The circuit of FIG. 9 may be constructed with commercially-available integrated circuit devices; for example, an MMBR901 device may be used for the oscillators 86 and 101 and RF amplifier 98, the power amplifier 90 may include this MMBR901 device and an MMBR571 device, the synthesizer 102 may be an MC145158 device, and the detector 108 may be an MC13055 device. PIN diodes are used for the antenna select switches and the T/R switch in the circuitry 91. The range of a transmitter of this construction is about 500 feet, in a commercial environment, at a power of about one watt; the transceiver consumes about 100 mA in the receive mode and about 450 mA in a transmit mode.

Figure 10:
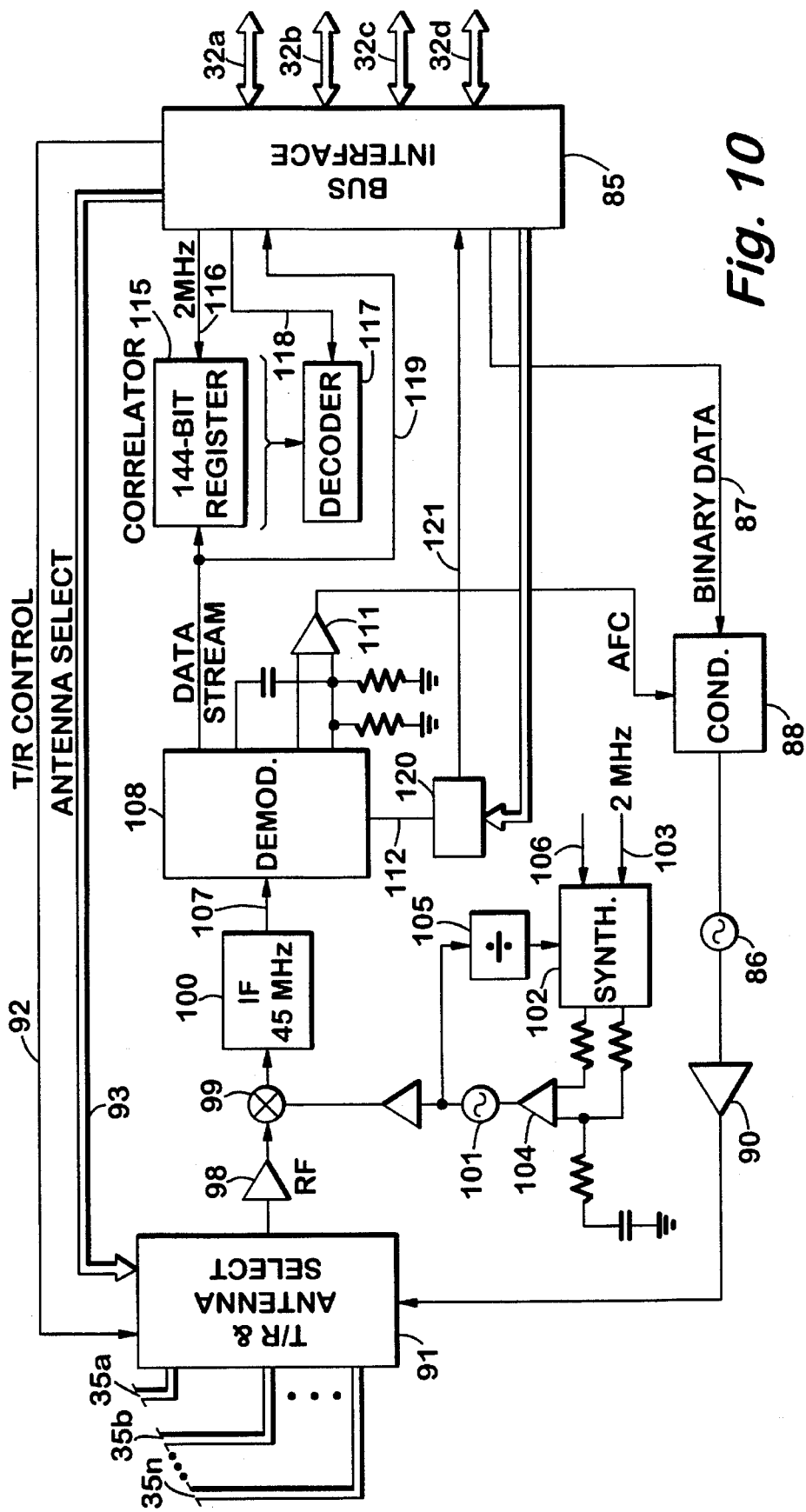
FIG. 10 is an electrical schematic diagram of the circuitry of the transmitter/receiver in a base station of the system of FIGS. 1 and 3.

Referring now to FIG. 10, the transceiver 34 is shown in more detail. This circuitry may be in large part the same as that of FIG. 9, with certain critical exceptions. The oscillator 86 with its conditioning circuit 88 and AFC feedback 110 is the same, as is the power amplifier 90. The power supply control 94 of FIG. 9 is not used in the base station, however, because the receiver must be operating at all times and of course there is no concern for battery drain. Serial binary data from the memory 31 is applied to input 87 from the interface 85 which is connected to the bus 32 consisting of a 16-bit address bus 32a, a 15-bit port bus 32b, a control bus 32c and a 24-bit data bus 32d, as is defined for the DSP56001 device used in one example; if a V-25 microprocessor is used, then of course the bus 32 will correspond to an 8088-type bus. The port bus 32b for a DSP56001 has fifteen lines used as either inputs or outputs by the microprocessor device 30, and so these can be used in place of the I/O registers mentioned above for the 8088 device in FIG. 9. The RF amplifier 98, mixer 99 and IF amplifier 100 are the same as in FIG. 9, as is the local oscillator 101, and the synthesizer 102. The binary input 106 to select the frequency of the synthesizer may be parallel rather than serial, for loading from the port bus 32b via interface 85. The transmit/receive selector circuit 91 is the same as in the remote units 15, but the antenna select may have more than two antennas, i.e., antennas 35a, 35b, 35n to select from (for example, eight), and the antenna select control on lines 92 is therefore more than one bit. The CPU 30 sends a multi-bit control via port bus 32b to select the antenna 35a, 35b ... 35n to be used. An important difference is that the serial data output from the detector 108 on line 109 is connected to a dedicated 144-bit (i.e., 3×48-bit) shift register 115 which is clocked at 2-MHz by clock input 116 from the CPU 30, to look for the 48-chip start symbol 72 in real time. In this manner, the most recent 144-bits of received, detected, sampled RF representing forty-eight chips 80 of the signal of FIG. 8a detected as seen in FIG. 8b, and sampled at the rate seen in FIG. 8c, are available in the register 115 at any given time. The content of this shift register 115 is decoded in real time, evaluated once every 2-MHz clock period, by a decoder 117 representing the pseudorandom binary code value used in the exclusive-OR function in the remote unit 15 to encode the data. This code value may be changed in the decoder 117 by loading a new binary number from the CPU 30 via interface 85 using the port bus 32b and input 118. Or, alternatively, the code used in the decoder 117 may be fixed by using a PROM device for this network or for this particular base station. When a valid 48-bit start signal 72 of a packet 17 is recognized in the decoder 117, using whatever level of confidence is selected (all the bits need not be valid), a signal is produced on the output 119 to the interface 85, which is recognized by the CPU 30 to mean that a valid packet 17 is incoming and so the serial data on line 109 is from that point copied to memory 31 through the intermediary of loading serially to a register in the CPU 30 then the CPU executes move instructions to load to the memory. Since only one of every three samples is the best data, then only every third bit need be transferred to the memory 31, or it can all be loaded and the CPU 30 can discard ⅔ of the incoming data on line 109. Another difference in this transceiver circuitry of FIG. 10, compared to FIG. 9, is that the RF signal strength output 112 from the demodulator 108 is an analog signal applied to a level detector 120 which receives a multi-bit value on lines 121 from the port bus 32$b$, so an output 122 from this threshold level detector 121 is available to be read by the CPU 30 via its port bus 32$b$. In this manner, the CPU 30 executes an algorithm to check the RF channels by switching RF frequencies among the sixteen or so available (via input 106 to the synthesizer), switching the antennas (via input 92 to the antenna select), and defining the level to look for (via lines 121), while for each trial copying the output 122 to memory 31. The optimum frequency for the carrier (in the 902 to 928 MHz band), and the optimum antenna 35$a$ to 35$n$, can thus be selected.

Figure 11A:
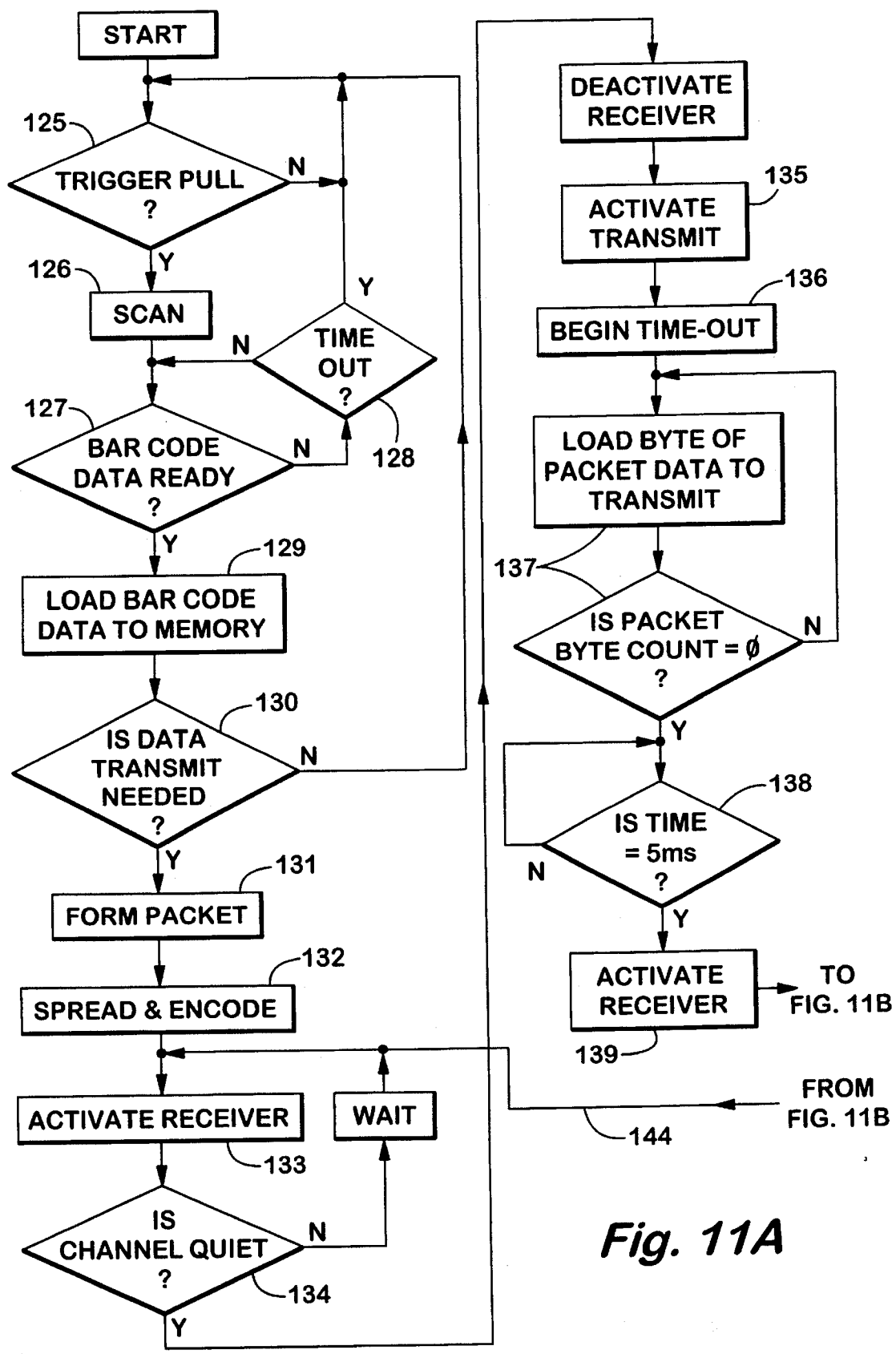
FIG. 11 is a logic flow chart of an algorithm which may be executed by the CPU in a remote terminal unit of FIGS. 1, 4 and 9 for a system according to one embodiment of the invention.
Figure 11B:
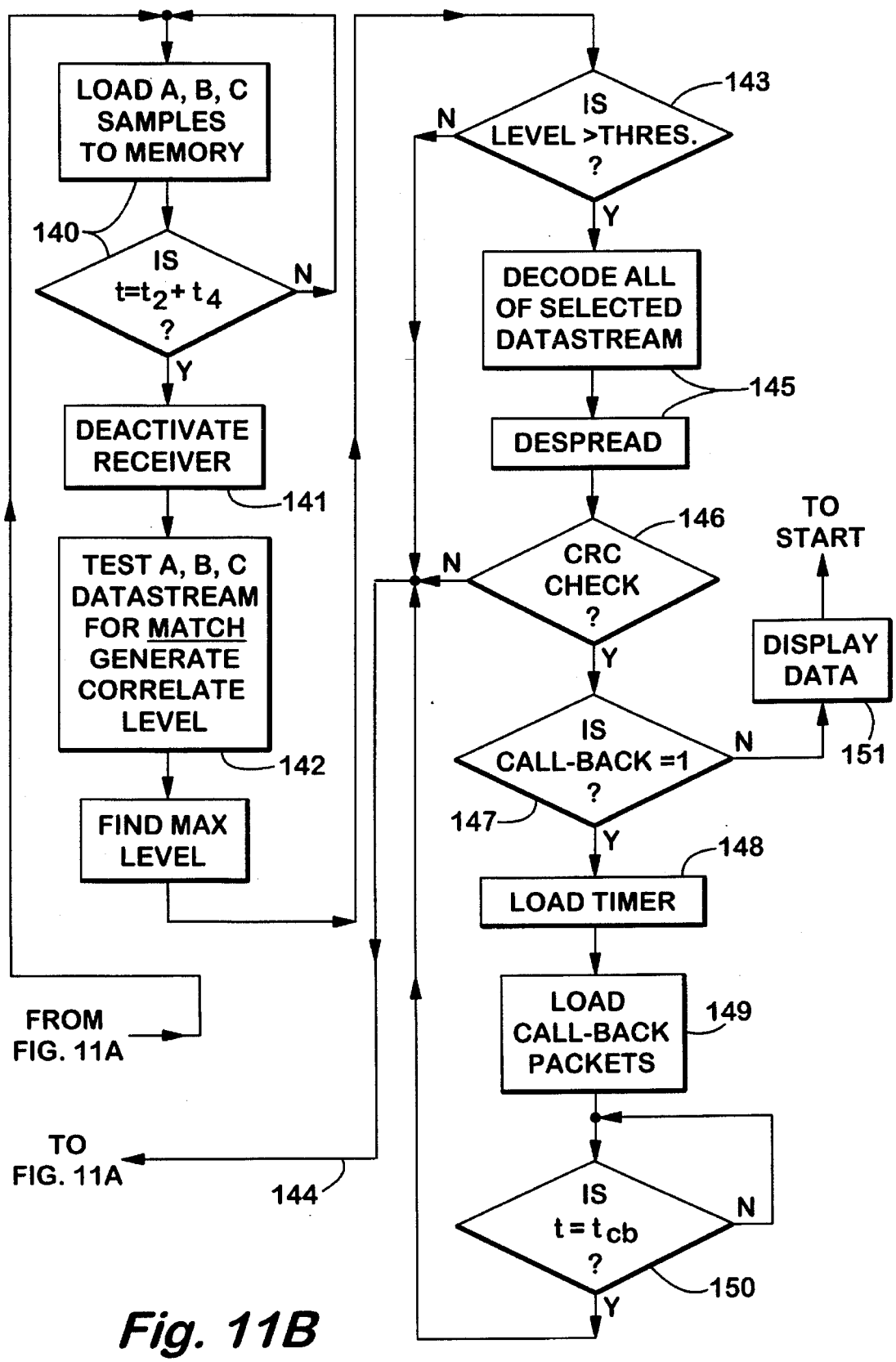

Referring to FIG. 11, a flow chart of one example of a type of program executed by the CPU 40 in the remote unit 15 is illustrated. For this example it is assumed that the laser-scan bar code reader of FIG. 5 is being used as the data gathering device. The idle state of the program is a loop indicated by decision block 125 which tests to see if the trigger 54 is pulled, and when "yes" the scan is initiated by activating the laser source 58 and the scan motor 60, indicated by the block 126. The CPU 40 then enters a loop 127 to wait for bar code data from the device 43; if no valid bar code data is detected by the end of a time-out period indicated by decision point 128, then control is returned to the start loop 125. If bar code data is detected, then block 129 is entered to load the bar code data to the memory 41 and check its validity using whatever criteria is appropriate for the specific use. Next, the decision point 130 determines whether or not a packet transmission is needed, and if so a routine 131 is entered to make up the packet by adding the start symbol 72, header 73 and the CRC field 79; if the byte count is less than twenty-nine for the data field 78, then nulls are added after the CRC field to provide a fixed transmission time. A routine 132 is then used to spread and encode the packet, and next the receiver is activated at point 133 by signalling the power supply 94 to apply supply voltage to the receive components via line 97 in FIG. 9. The CPU then queries the output 112 to see if the channel is quiet, indicated by decision point 134; if not, a wait loop 135 is entered to delay a selected time before retrying by going back into the activate receiver block 133. If the channel is quiet, the receiver is deactivated, and the transmitter circuitry is activated at the block 135, and a timer started to define the time periods of FIG. 2, indicated by the block 136. Bytes of the transmit packet 17 are loaded from the memory 41 to the transmitter by a loop routine 137 which counts the bytes, and when all have been loaded the time-out to determine the time $t_2$ is entered at decision block 138. When the time-out is reached, the receiver is activated at point 139, and a loop 140 is entered to load all of the A, B and C samples from the transmitter to the memory 41. When $t_2+t_4$ is reached, the receiver is deactivated at block 141, and the CPU enters a routine 142 to test each of the A, B and C sample data streams corresponding to the time $t_3$ to generate a correlate-level indicating the degree to which there is correlation with the expected start-symbol decode for a valid packet. The highest correlate-level is picked (A, B or C), and tested at decision point 143 against the threshold established for assuming a good packet (e.g., 41-of-48). If this test fails, then it is assumed there was no acknowledge packet 18 received, and the packet is resent by re-entering the flow at block 133 via path 144. If the test passes, then the CPU decodes and despreads the selected A, B or C data stream, at blocks 145, and performs a CRC check at point 146. If CRC fails, the packet 18 is discarded and the path 144 to resend is entered. If CRC passes, the CPU enters a routine 147 to see if a call-back request is included in the data in the packet 18, and if so then a timer is loaded at point 148 to begin counting down the period requested by the base station in the acknowledge packet. A standard call-back packet 17 is generated in the memory 41 by a routine 149, containing no data field but merely functioning to allow the base to send data to this remote unit. A loop 150 is entered to wait for time-out of the period set in block 148, and when reached the transmit function is entered by path 144. If no call-back request was present, then the CPU takes whatever action dictated by the data, ordinarily including displaying received data at block 151, then re-enters the start loop 125.

Figure 12:
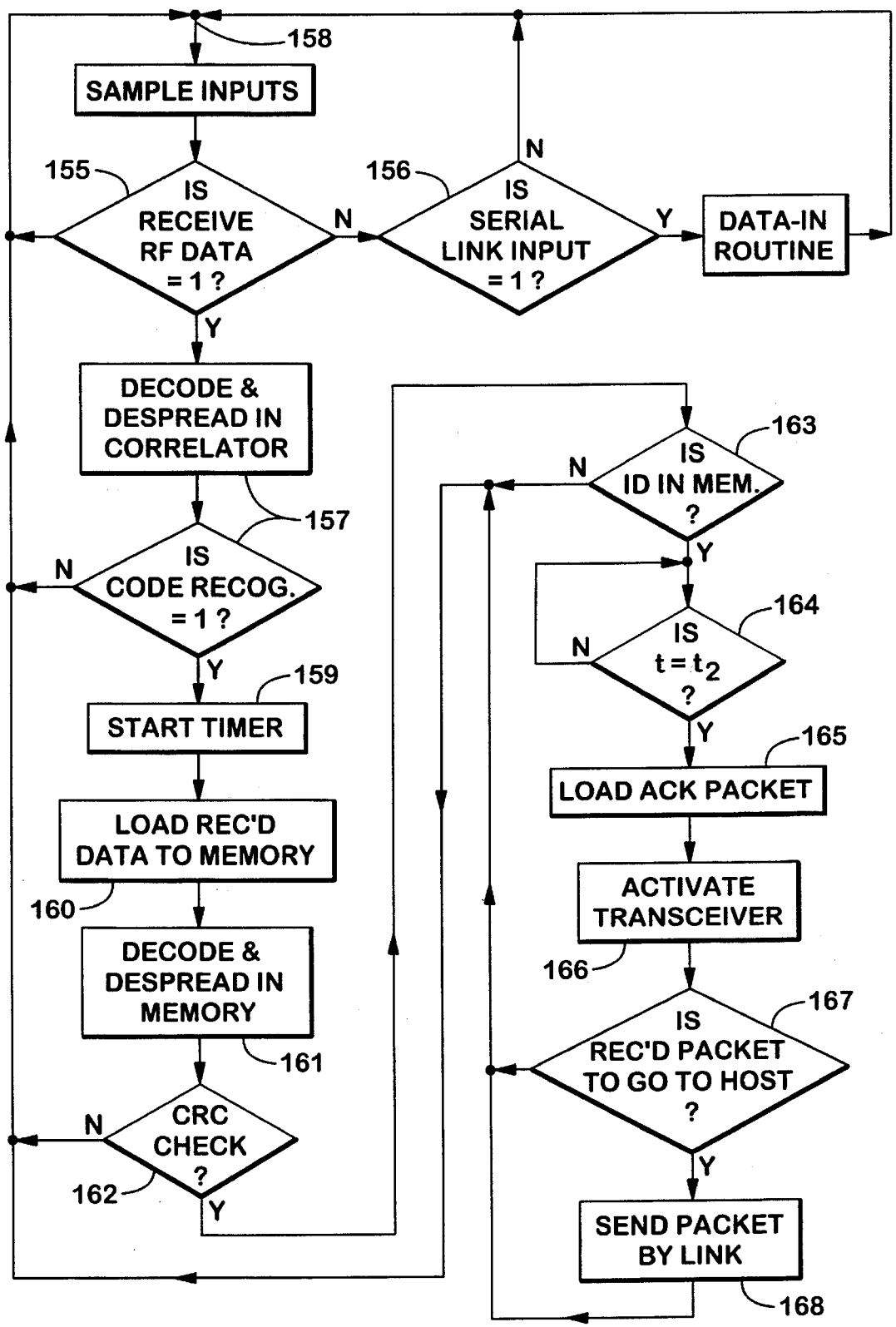
FIG. 12 is a logic flow chart of an algorithm which may be executed by the CPU in a base station of FIGS. 1, 3 and 10 for a system according to one embodiment of the invention.

Referring to FIG. 12, a flow chart of one example of a type of program executed by the CPU 30 in one of the base stations 12, 13 or 14 is illustrated. An idle state of the program is a loop indicated by the decision blocks 155 and 156 in which the receive-RF indicator at line 121 is checked to see if a signal is being received from a remote unit, then if not the serial link 11 is checked to see if there is incoming data from the host computer. First, assuming the receive-RF signal is positive, the correlator including the register 115 and decoder 117 is evaluating the incoming RF, decoding and despreading the RF input and checking whether code recognition decoder 117 indicates a match, as indicated by blocks 157; if not the input is ignored and control returns to the start via path 158, but if so then a receive-packet sequence is begun by starting a timer at block 159 to time out the period $t_2$ of FIG. 2. The data stream received via the RF signal is thereafter loaded via path 119 and bus 32 to memory 31, indicated by block 160. This received data is decoded and despread using routines executed by the CPU, as indicated by the block 161, then the CRC field 79 is checked as indicated by the decision point 162. If the CRC compare fails, the packet reception is aborted and control returns to idle via path 158. If the compare is successful the device ID field in the data stream is checked against the table of valid IDs in memory by the CPU as indicated by the decision point 162, and if not matched then the reception is aborted and control returns to the idle or start state via path 158. If the device ID is valid, a time-out loop 164 is entered to wait for time $t_2$ so that the ACK packet can be loaded at 165 and sent at block 166. If data is waiting to be sent to this remote unit it will be included in the ACK packet, but if not then a mere acknowledgement is sent wherein the ACK packet is nulls, except for the header. The decision point 167 is entered to determine from the content of the received packet if it is to be sent to the host 10. The remote units, when idle, send packets 17 to check in, periodically, so if data is waiting to be sent to a remote it can be returned in a packet 18; for these check-in exchanges, no data need be forwarded from base to host. However, if data is being sent from remote unit 15 to the base (e.g., bar code data), then the data is sent via link 11 as indicated by block 168.

The construction of the base stations and remote units as described above provides a method of selecting the quietest channel for operation, as has been referred to. The RF channel used is selected under CPU control via the input 106 to the synthesizer in FIG. 9 or 10. A base station first operates on an initial channel, as might be set up upon power-on of the base and remotes, or upon initialization when the remotes are plugged into the base stations via RS232 connections to begin a day of operation or a shift. Periodically, or in response to a deterioration in signal quality, the base station switches through all the other available frequency channels (i.e., other than the initial channel) to detect via the output 122 to the CPU an optimum channel (least interference or quietest channel-least RF energy). In addition, the base station produces a value corresponding to the error rate in the initial channel, using the quality factor as described below; if the transmission error rate exceeds a selected threshold level (quality is below standard) then the base station goes into a change-channel mode, in which a message is sent to each of the remote terminals that this base station communicates with, advising that further communication exchanges are to be at a new channel (the quietest channel). These messages are sent by the acknowledge packets 18 in response to the next exchange initiated by each remote unit 15, as when a remote unit checks in using the initial channel. Usually, the message will specify a given time in the future (long enough for all remotes to have initiated a check-in exchange) that will be the change-channel time. If a remote unit misses the message to change channels, its next attempted exchange using the initial channel will not be acknowledged; in this case, the remote will seek the correct channel by attempting each of the sixteen channels until an acknowledgement is received on the new channel.

It is to be noted that the direct sequence spread spectrum RF modulation technique used in the example embodiment is to be distinguished from the frequency-hopping method in some spread spectrum systems; the frequency-hopping method consists of "spreading" a small number of data bits to a large number of chips of many different frequencies with a pseudo noise generator, i.e., pseudorandom spreading over a large number of frequencies rather than the direct sequence method used here. The pseudorandom frequency hopping method would be more costly to implement in this system, compared to the direct sequence method, because the RF circuitry needed in the remote unit as illustrated in FIG. 9 would be more complex and expensive. Thus the direct sequence approach employing only two frequencies is better suited for the present system, as the complexity is imposed upon the CPU to code and decode binary data, rather than upon the RF section to generate rapid switching of frequencies among a widely spread number of alternatives. In other systems having different objectives, the features of the invention may be used in a system employing the frequency-hopping method.

The pseudorandom binary code value used to "exclusive-OR" with the data need not use an error-correcting code (although an error-correcting code may be used if desired). In the procedure used it is not intended to combat impulse noise in the RF spectrum. If a transmitted packet 17 or 18 gets clobbered by noise, then it will not be recognized by the decoder 117, or by the equivalent software decode from memory 41 in the remote unit 15, and so the packet will be retransmitted; if the remote unit 15 does not receive a packet 18 it will retransmit its packet 17 after a timeout period.

The modulation method used in the transceivers 34 and 46 is noncoherent FSK (frequency shift keying). This technique is vulnerable to certain kinds of jamming, such as a strong single frequency (noise) within the 902–928 MHz band. This band is used for all types of equipment, with no restrictions, and may be used by RF melting equipment, etc., in the area. If jamming of this type occurs, the algorithms executed by the CPU 30 in the base station may be used to recognize the very high error level via input 122 and so a command is sent to the synthesizer 102 in the RF transceiver 34 to select another of its sixteen frequency bands, and hopefully the new one allows better transmission. The feature of the RF transceiver 34 in a base station being able to measure the instantaneous RF energy at output 122 within any of the sixteen bands it can use, is an important one; this allows selection of the quietest bands available for the frequency used for the exchanges via packets 17 and 18.

The transceiver 34 in the base station responds to the synchronizing start signal 72 of a packet 17 in real time by means of the register 115 and decoder 117, in contrast to the remote unit 15. The remote unit serializes the packet or chip sequence to the RF transmitter oscillator 86, then waits a precise amount of time (about 5-msec), as established by a timer register controlled by the CPU 40 counting the 2-MHz clock, and then samples the output 109 of the RF receiver 108 at precisely three times the chip rate as seen in FIG. 8c. The samples are divided into three sample streams A, B and C, each datastream slightly longer than one packet 18 time, and stored in the memory 41. These sampled data strings are presumed to be a response packet 18 from the base. The CPUs 30 and 40 are of course asynchronous, but the timing of the 2-MHz clocks for these CPUs in the remote units 15 and the base stations 12, 13 and 14 should be matched to within about 40-ppm (parts per million, i.e., chips or 1.5-microsec periods of drift per million chips) so that during detection of one of the packets 17 or 18, which are a maximum of 2600 chips in length, the drift does not exceed a small fraction of a chip, i.e., a very small part of 1.5 microsec. This clock accuracy is available with low cost crystal oscillators.

After the received data is in the memory 41, the code executed by the CPU 40 determines which of the three sample streams to use, and where in that stream the record starts. There are three levels of synchronization that the remote unit 15 must achieve: phase sync, symbol sync and packet sync. Phase sync has to do with finding which of the three samples A, B or C per chip is nearest the center of the chip, and therefore most likely to represent the true value of that chip; as seen in FIG. 8c, one of the sample sets A, B or C is usually more likely to be at about the center of the waveform of FIG. 8b so this one will be most accurate, but one or two of the sets will be near the transition points and so will be the most indeterminate. Symbol sync is the alignment of the incoming chip stream with the starting point of the >2600-bit long binary code value. Finally, record or packet sync is finding the beginning of the packet 17 or 18. Since all transmissions to a remote unit 15 begin with a fixed chip pattern (the synchronizing signal 72), the remote unit 15 accomplishes all three levels of synchronization at once by examining the first few samples. To give a simplified example, suppose the fixed chip pattern is eight chips long and the record is believed to have started within a six microsecond (4-chip) window. At three samples per chip, there are twelve places where the packet 18 may have started. For each potential starting place, the corresponding 8-chip sequence is extracted and with a table lookup compared with the desired sequence; if one is found to be an exact match or very close, then most probably all three synchronizations have been accomplished. Unlike some conventional spread spectrum methods, once phase sync is accomplished there is no need for phase tracking because the transmitted packets 17 and 18 are so short and there are practically no Doppler effects; the remote units 15 are either stationary or moving at very low speeds at the time of transmission. If the best match that can be found in the table lookup is not very good, the packet 18 is discarded at this point and a new exchange is initiated, using the alternate antenna or another frequency.

A hand-off protocol is used to assign each remote unit 15 to a specific base station. It is essential that only one base station 12, 13 or 14 be assigned to a remote unit 15 at a given time; otherwise two base stations might respond simultaneously to a packet 17 when a remote unit attempts an exchange and the two acknowledge packets 18 would interfere with each other. Before any base station will respond to a remote unit at all, the base station must receive the serial number or device ID for a remote unit 15 from the host computer 10 via link 11 and make a table entry in its memory 31. All base stations receive this same number from the host, but only one base station arbitrarily assigns itself to this remote unit using some algorithm; for example, the base stations may merely select remote units based upon the serial numbers or device IDs. If a base station receives a packet 17 from one of its remote units (having the device ID corresponding to one in its list), this base station sends an acknowledge packet 18 responding to the exchange and records in its memory 31 the time and quality (number of errors) of the data packet 17. Any of the other base stations also receiving this packet 17 of the exchange from this remote unit merely record the time and quality. Every minute or so, each base station publishes (sends to the other base stations via link 11) the list of remote units it has heard from in the last minute and the quality. If another base station has a much higher quality rating than the one initially assigned, the assignment for this particular remote unit moves by messages exchanged between the two base stations involved. At any one time, each base station has in memory a list of the serial numbers (or ID numbers) of the remote units it will respond to, and whenever a packet 17 is received the ID number in the field 74 is compared to the list in memory to see whether a response packet 18 is to be sent from this base station.

There are many reasons why a remote unit 15 may receive no response to an exchange as in FIG. 2 that it initiates, and for each reason, a different strategy is available to regain communication. One problem is that a remote unit has moved out of range of one base station, but is still within the range of another station. In this case the remote unit sends a "distress call", which is a short packet 17 consisting of little more than the standard synchronization signal 72 and its serial number. This packet is sent twice, once from each of the two antennae 35a and 35b. For this special type of exchange the response may come a fixed amount of time after either the first or second such packet 17. A longer delay time, e.g., 100-msec, is allowed for the response packet 18 to permit any base station hearing the distress call to communicate by an exchange with the base station normally in charge of this remote unit. After the base station in charge has heard from all other base stations which heard the call, it can determine which one should be the new base station in charge and "pass the baton" to that base station in time for that base station to send the response packet 18. The response will indicate which antenna worked the best, i.e., produced the fewest errors. If the remote unit receives no response to this distress call, this remote unit is probably out of range of all base stations at the moment (inside a metal truck, for instance), and the distress call is tried again later after a time out period. After several minutes of being out of communication the algorithm executed in this remote unit will conclude that the network operation frequency has changed and distress calls will be sent on the other frequencies, one at a time.

An important feature of one embodiment of the invention is the measurement of the quality factor of the received packets 17 at the base stations 12, 13 and 14. As noted above, this quality factor is used in determining which remote unit is assigned to which base station, either initially, or in periodic realignments, or upon a distress call. The quality factor is the number of valid bits resulting from the decode of the 44-bit start symbol 72 at the decoder 117; the packet is accepted as good data even if the number of valid bits found when comparing the incoming symbol 72 with a stored version of the correct pseudo-random code is (in the example) 35-of-44, but this number is saved in memory 31 even if it is in the 35-to-44 range and is used to determine which base station is getting the best signal from a given remote unit. That is, the assigned base station may be able to receive and decode the incoming packets quite adequately, but it may be averaging a quality factor of thirty-eight, whereas another base station may be receiving these same packets with a quality factor of forty-four, so obviously the later is in a more favorable receiving situation with respect to the remote unit in question and so the next time a set of messages are exchanged between base stations, the baton should be passed to the base station receiving better quality. Note that this quality factor is different from merely measuring the signal strength, which is less significant in this type of environment due to the high degree of multi-pathing; also, the signal strength varies with distance, and can vary orders of magnitude and still give perfect reception. Just measuring the RF level won't tell what the noise and interference environment is. Also, it is noted that since error detection and correction is not employed in this system because it is very compute intensive, there is no quality measure available short of a catastrophic failure (which would occur when the CRC didn't check), and so the use of this correlation number from the decode of the start symbol 72 provides a measure that can give an early indication of deteriorating signal, long before the signal gets so bad it would be unusable. The quality factor (correlation coefficient for start symbol 72) can be used in conjunction with the RF signal strength indication available at the input 121 in a base station; if the correlation is bad but the RF signal strength is good, there is a frequency problem and so the channel is changed, but if correlation is bad and signal strength is bad, the base station is changed by baton passing.

Although the 24-bit serial number of every remote unit ever to be manufactured is probably unique ($2^{24}$ is 16-million), most remote unit message packets 17 have only a 13-bit handle or nickname in their message header field 74. If two networks of FIG. 1 are in overlapping areas, their messages could get mixed up; at a trade show, for example, several of these networks could be in the same RF space. The base stations of each network can pick a different frequency to use during the initialization period when all frequencies are checked for noise or traffic, and further the initial messages from each remote unit can require the full serial number. A much more secure technique dictates the use of a different random chipping pattern for each network, i.e., a different pseudorandom binary code used to exclusive-OR the data with. Then two networks would be unable to decipher each other's messages, or even detect the presence of each other; there would be added collisions but the packets of one would be totally undecipherable to another network. This technique of using different chipping patterns, however, requires that the network manager (a human being) initializes each remote terminal. To this end, each remote unit 15 has an RS-232 connector (coupled to the bus 42) which is coupled to the host computer 10 temporarily for initialization, at which time the unique pseudorandom binary code value is loaded to the memory 41 and thereafter used in the exclusive-OR function. The handle to be used as the ID field 74 of a packet 17 is also loaded at this time. Base stations connected to the host computer 10 through a cable 11 are initialized over this cable. Base stations connected to the host computer 10 only through an RF link (e.g., base station 14 as illustrated in FIG. 1 ) could use a default chipping pattern which is used only for initialization, but preferably are temporarily connected by the serial link 11 for initialization then later operate by the RF link. A base station may be programmed to change to this default pattern on command from the host computer or when out of communication for a long time. An alternative method for security in overlapping networks requires every message packet 17 or 18 to contain the full 24-bit serial number of the remote unit. This adds 11-bits to the header overhead, and assumes that the manufacturer can always control the serial numbers in all devices to be made.

In one embodiment, a different binary code sequence is used in the spreading and encoding steps in each base station and its assigned remote units. In this case, one of the remote units 15 can be executing an exchange with its base station 12, 13 or 14, while at the same time another remote unit 15 is executing an exchange with its base station, even if the two pairs are within RF range of each other; this is one of the advantages of the spread spectrum technique, in that several simultaneous transmissions in the same band can be separated by using different code. Alternatively, if each of these base stations is using a different frequency in the 902–928 MHz band in its communications with its remote units, then likewise simultaneous exchanges can be executed. Up to about a thousand of the remote units 15 can be supported in a local area if the average duty cycle is low. Without invoking protocol features to minimize collisions, each base station can sustain about twenty-five randomly occurring exchanges per second. The limiting factor then becomes the host computer 10, and the transaction processing power of the host can be expanded by using faster clock speed, higher MIPS rate, parallel processors, and known techniques of this type.

The overhead (i.e., lost time) imposed by the protocol of FIG. 2 could be substantially reduced by increasing the length of the packets 17 and 18. That is, if the packets transmitted a data field 78 of much longer than 22-bytes, then the ratio of time used to transmit data to total time of transmission would increase and thus the efficiency would increase. However, this increase in packet length would also substantially increase the accuracy requirements on the time references (local clocks and counters) for both base stations and remote units. The local time references are needed to avoid losing phase synchronization near the end of the packet the locally assumed chip boundaries used by a receiver must match those actually used by the transmitter as explained with reference to FIGS. 8a–8c. Putting resynchronization fields (additional fields like the field 72) throughout the elongated packet would reduce such accuracy requirements, but this would partially defeat the purpose of a larger packet because the filed would occupy time and time would be lost in resynchronizing. Furthermore, the checksum field 79 would perhaps have to be enlarged for larger packets. Finally, in a noisy environment, the percentage of packets which have to be retransmitted rises with packet size, and so a larger packet would result in loss of efficiency due to retransmissions. It is for these reasons that the relatively small packet size of the standard exchange is chosen as described.

Another alternative construction of the system is to increase the chipping rate to either increase the spread factor for greater range and noise tolerance or to increase the data rate. This alternative, however, requires more costly hardware, and, of course, raises compatibility issues. In addition, an alternative construction is to increase the capacity of transfer of data between base stations; large networks may be capacity limited in the base net 11, and in such case may benefit from a higher capacity base having higher performance radio transceivers 34a and more computation power than discussed above. These higher performance base stations would be able to communicate with each other at much higher data rates and communicate with remote units and standard bases on many frequencies simultaneously; other link media may also be used, such as fiber optics.

A key problem in spread spectrum systems is acquiring chip synchronization, i.e., synchronization between incoming chips and the pattern of 1's and 0's (representing the pseudorandom number) to be matched at the receiver. Chip synchronization involves looking for what may be an infrequently appearing pattern (the synch field 72 in the packet 17 or 18) in a noisy received signal. If the incoming message packet starts at some arbitrary time, the search involves taking in a lot of data (noise) and searching through it using a CPU and memory or else using hardwired logic; this requires either a lot of time or expensive hardware. The difficulty of this search is reduced by providing a clue as to where to look for the pattern.

In the protocol described above, the remote unit 15 always initiates communications by a packet 17 and the base station responds in a very predictable amount of time with a packet 18 beginning at $t_2$ of FIG. 2. Thus, at the remote unit 15, the search for the beginning of the pseudorandom sequence can be narrowed to a very narrow window $t_3$ (3-μsec in the example) when it is known the response packet 18 will come, and synchronization is very close before the search is even begun. If the window is within a chip time of 1.5 μsec, standard tracking techniques as described with reference to FIGS. 8 and 9 will pull the receiver into synch. As seen in FIG. 13, the receiver will try to match a pattern 170 (the pseudorandom number) with the incoming field 72 of packet 18, and will find that an offset of ΔT is needed to pull into synch and generate a match. If the amount of pulling, or the value ΔT in FIG. 13, needed at one packet reception is recorded in the memory 41 of a remote unit 15, this value can be used on the next exchange to refine the estimate of the timing of receipt of the start symbol 72 of the packet 18; that is, the starting time of the assumed reception pattern 171 of FIG. 14 is assumed to be $t_2 \pm \Delta T$ instead of $t_2$. This estimated start time should be correct within a chip time of 1.5-μsec unless a long period of time elapses before the next exchange, during which conditions may have changed. Thus, under normal conditions, the remote unit 15 can acquire synch very quickly without a correlator as is used in the base stations, by merely recording the deviation from $t_2$ for one acknowledge packet 18 and adjusting the assumed starting time for the packet 18 of the next exchange.

If a remote unit 15 can not estimate correctly within a chip time, a request can be made to the base station to send a test pattern 173, according to another embodiment illustrated in FIG. 15. The test pattern 173 sent by the base station is a packet 18 but has a straight chipping sequence, or at least a predictable pattern. That is, the test pattern 173 may be a continuous synch field 72 for a suitable length of time, and is of course in response to a packet 17 as before. On receiving this pattern 173 and storing it in memory 41 (along with noise starting at $t_2$), the remote unit 15 by its CPU 40 takes a guess as to the proper pseudorandom number sequence offset, i.e., it tries a pattern 174 of FIG. 15, offset from $t_2$. If after a suitable integration time no response is noted from an envelope detector (i.e., detecting valid decoded characters), the pseudorandom number sequence offset is adjusted by a chip time to another position 175 and the scan is continued. This procedure is continued for the length of the test pattern. If a peak from the envelope is detected, coarse acquisition has probably been detected. Otherwise, the entire sequence is repeated, requesting another test pattern from the base station by sending another packet 17 from the remote 15, and then using a different starting synch offset at the remote unit 15.

Alternatively, the remote unit 15 can make several guesses about where the starting point of the sequence is, one chip apart, as illustrated in FIG. 15, and then decode them all simultaneously. If the number of guesses exceeds the number of possibilities and a valid response has been received, one of the guesses will lead to a proper decode. Although this approach may appear to require more hardware than the previous approach, the cost may be acceptable if the number of legitimate possibilities is kept to a small enough number.

Note that these techniques will work regardless of the length of the pseudorandom number sequence. It is not necessary for the pseudorandom number sequence to repeat during a packet, nor is it necessary to use a long header.

The primary source of variance in the pseudorandom number sequence offset is the variation in distance between the base and the remote. Assuming the speed of light to be 1000 feet per microsecond, a variation in the length of radio path between base and remote of 500 feet varies the round trip delay by a microsecond, or two chip times at a two megachip rate. Since the entire range of motion of a remote unit is often less than 500 feet, and typical movements from one packet exchange to another are often less than ten feet, this should not cause a problem.

A base station 12, 13 or 14 and a remote unit 15 may have mismatched master clock frequencies at clock inputs 116 and 103 which causes their chipping rates to be slightly different. Using inexpensive crystal oscillators as the clock sources for inputs 116 and 103 could cause errors of one-hundred parts per million, for example. This much error normally requires both receivers 34 and 44 to track the pseudorandom number sequence of the incoming signal (i.e., adjust the frequency of the local oscillator during a packet time). A method which can help here is for the base station to have good pseudorandom number tracking of the received packet 17 with a phase locked loop, and then to use this phase locked loop in free running mode to clock the response packet 18 going to the remote unit 15, rather than using the clock of the base station; that is, the frequency of the clock of the remote unit 15 is detected during packet 17 and duplicated and used by the base station in its response packet 18. This reduces or eliminates the requirement of the remote unit 15 to acquire the frequency of the incoming signal in its receiver 44, provided a good enough acquisition can be achieved initially by the base station.

According to another embodiment of the invention, therefore, a method is provided for achieving timing synchronization between the transmitting unit and a receiving unit in the communication link between remote and base units as described above, and for maintaining this synchronization for long packet lengths. This method takes advantage of the mode of operation of the system described above as being single point to multipoint (base station to multiple remotes), and places the primary responsibility for timing synchronization on the base station, which operates from a fixed location from AC line power (rather than being portable with battery power).

Figure 10A:
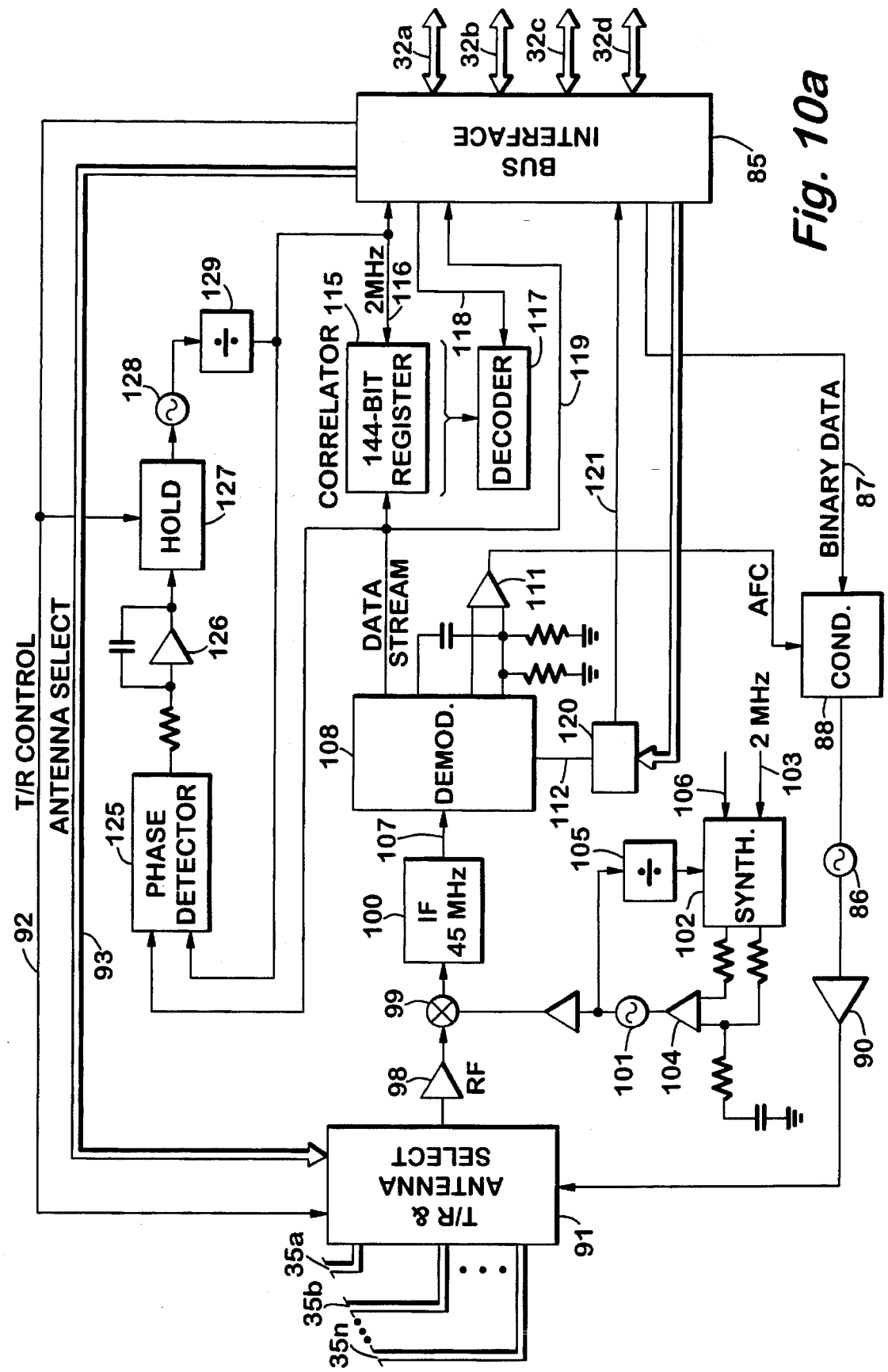
FIG. 10a is an electrical diagram of a part of the circuit of FIG. 10, according to an alternative embodiment.

According to this embodiment, when differences in the clock frequencies of the base station and remote units are enough to cause tracking difficulties, a timing synchronization technique is used. This timing synchronization uses a phase-locked loop or the like to adjust both the phase and frequency of the local 2 MHz data clock 116 of the base station of FIG. 10a to that of the 2 MHz component of the data stream 119 received from remote unit of FIG. 9 during the beginning of an incoming packet 17 at the base station. The 2 MHz component of the received data stream 119 will be identical in frequency to the 2 MHz reference signal 103 of the remote 15, but it will differ in phase due to the variable delay associated with the distance between the two units as described previously. Because there is no way to predict when a packet 17 will be received at the base, this circuitry is energized at all times, and it must function rapidly to acquire synchronization. Referring to FIG. 10a, the base station receiver 34 is the same as shown in FIG. 10, except that a phase-locked loop circuit consisting of phase detector 125, loop filter 126, hold function 127, voltage-controlled local reference oscillator 128 and frequency divider 129 has been added. This circuitry causes the local reference oscillator 128 to be adjusted such that the local 2 MHz data clock 116 is identical in frequency and phase to the component of the 2 MHz reference clock 103 of the terminal 15 included in the received data stream 119. The base station 12 utilizes this synchronized data clock 116 to block the shift register 115 as well as utilizing it to clock data into CPU 30. The base station 12 then maintains this frequency and phase adjustment during the entire time it is receiving the packet 17; in this arrangement, there is no inherent limitation to the length of the packet 17, as there would be if phase errors were allowed to accumulate. After receipt of packet 17 is completed, the base station 12 begins transmitting an acknowledge packet 18 to the remote terminal 15. While transmitting this acknowledgement packet 18, the base station 12 causes the hold function 127 to be actuated keeping constant the frequency of the local 2 MHz data clock 116 which has been adjusted to be identical in frequency to the 2 MHz reference frequency 103 component received from the remote 15. In this embodiment, the remote 15 would receive and decode the data stream 109 from the base station 12 in the same manner as explained previously. Because there is now a minimum of frequency difference between the two units, much longer data packets can be accommodated without a loss of synchronization than could be accommodated in previously described embodiments. The primary responsibility for achieving and maintaining timing synchronization is, by this method, placed on the base station 12; the remote terminals 15, which are greater in number, compact and operated from battery power, are thus relieved of most of the responsibility for timing synchronization—the complexity required for rapidly acquiring and maintaining timing synchronization is placed in a single base station 12 allowing the remote terminals 15 to remain uncomplicated in this regard. An additional benefit derived from this embodiment is that by the base station 12 utilizing the 2 MHz data clock 116 to calculate the proper time at which to respond to the remote terminal 15, the remote terminal 15 will be able to predict more accurately when to expect an acknowledge packet 18 because this data clock 116 has been adjusted to be equal in frequency to the 2 MHz reference clock 103 utilized by the remote terminal 15 to calculate this time.

An alternate embodiment, if long base-to-terminal packets 18 are desired, is to provide the ability in the remote terminal 15 to adjust the phase of local 2 MHz data clock 134 in FIG. 9a to slowly track the phase of the 2 MHz component of the received data packet 18 to account for drift in the frequency of base station clock oscillator 128 of FIG. 10a while it is being held. This could be accomplished with the phase lock circuitry shown in FIG. 10a which consists of oscillator 130, phase detector 131, frequency divider 132 and decoder 133. This circuitry would function to add or subtract a variable number of pulses from the pulse train being supplied to frequency divider 132 as required to maintain the local data clock 134 in phase with the 2 MHz component of the received data stream 109. The number of pulses added or subtracted would be controlled by the decoder 133 which provides a measure of the magnitude of the phase difference between the local 2 MHz data clock 134 and the 2 MHz component of the received data stream 109. Operation of this circuitry would be enabled only during the time that data packet 18 was being received from the base station 12 so that the phase of data clock 134 would not change during the transmission of data packet 17. The operation of this circuitry would be facilitated by the fact that the frequency of 2 MHz component of the packet 18 received from the base station 12 would be adjusted initially to be equal to the frequency of the data clock 134 of the remote terminal 15 at the end of its transmitted packet 17. By combining the techniques illustrated in FIG. 9a and FIG. 10a, there would be no practical limitation on the length of the data packets 17 and 18 transmitted between the base station 12 and the remote terminal 15.

While the invention has been described with reference to a specific embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of transmitting data packets from one of a plurality of remote terminal units to a base station, comprising the steps of:

a) transmitting a data packet from said one unit to said base station during a first time period selected by the unit;

b) receiving at said one unit from said base station a reply signal during a second time period occurring only during a selected time window after said first time period, said second time period being the same for at least some of said units.

2. A method according to claim 1 wherein said steps of transmitting and receiving are by spread spectrum RF signals.

3. A method according to claim 1 wherein said remote terminal unit is one of a plurality of remote stations associated with the transmitter of said reply signal.

4. A method according to claim 3 wherein said remote stations are hand-held data-gathering units which include manual control elements, and wherein at least some of said remote stations include bar-code reading devices.

5. A method according to claim 1 wherein said reply signal is transmitted by a second station which is one of a plurality of said second stations physically spaced from one another, and there are a plurality of said remote terminal units for each said second station.

6. A method according to claim 1 including the step of listening at said unit prior to said step of transmitting said data packet to see if other like units are transmitting.

7. A system for transmitting data packets from one of a plurality of first stations to a second station, comprising:

a) a transmitter in said one first station for transmitting a data packet from said one first station to the second station during a first time period selected by said one first station;

b) a receiver in said one first station for receiving a reply signal from the second station during a second time period occurring only in a time window referenced to said first time period by a selected delay, said selected delay being the same for all said plurality of first stations.

8. A system according to claim 7 wherein said transmitter and receiver employ spread spectrum RF signals.

9. A system according to claim 7 wherein said first station is one of a plurality of remote stations associated with a transmitter of said reply signal.

10. A system according to claim 9 wherein said remote stations are hand-held data-gathering units which include manual control elements, and wherein at least some of said remote stations include bar-code reading devices.

11. A system according to claim 7 wherein said reply signal is transmitted by a second station which is one of a plurality of said second stations physically spaced from one another, and there are a plurality of said first stations for each said second station.

12. A method according to claim 7 including means for listening at said first station prior to said transmitting said data packet to see if other like units are transmitting.

* * * * *

(12) EX PARTE REEXAMINATION CERTIFICATE (6272nd)
United States Patent
Tymes et al.

(10) Number: US 5,479,441 C1
(45) Certificate Issued: Jun. 24, 2008

(54) PACKET DATA COMMUNICATION SYSTEM

(75) Inventors: LaRoy Tymes, Palo Alto, CA (US); John W. Kramer, Jr., Allison Park, PA (US)

(73) Assignee: JPMorgan Chase Bank, N.A., New York, NY (US)

Reexamination Request:
No. 90/007,742, Sep. 30, 2005

Reexamination Certificate for:
Patent No.: 5,479,441
Issued: Dec. 26, 1995
Appl. No.: 08/183,069
Filed: Jan. 18, 1994

Related U.S. Application Data

(60) Division of application No. 07/799,172, filed on Nov. 27, 1991, now Pat. No. 5,280,498, which is a continuation-in-part of application No. 07/635,859, filed on Dec. 28, 1990, now Pat. No. 5,142,550, which is a continuation-in-part of application No. 07/374,452, filed on Jun. 29, 1989, now Pat. No. 5,029,183.

(51) Int. Cl.
*H04B 1/69* (2006.01)

(52) U.S. Cl. .................................. 375/130; 375/E1.002
(58) Field of Classification Search .................. 455/450, 455/451, 452.1, 453, 466, 15, 16, 507, 509, 455/515–517; 370/277–281, 294, 310.2, 370/319–322, 329–337
See application file for complete search history.

(56) References Cited

U.S. PATENT DOCUMENTS

| | | | |
|---|---|---|---|
| 3,251,034 A | | 5/1966 | Goode et al. |
| 3,959,589 A | | 5/1976 | von Roesgen |
| 4,022,973 A | | 5/1977 | Stackhouse et al. |
| 4,197,500 A | | 4/1980 | Klein et al. |
| 4,291,410 A | * | 9/1981 | Caples et al. ............... 375/345 |
| 4,334,171 A | | 6/1982 | Parman et al. |
| 4,418,277 A | | 11/1983 | Tremmel et al. |
| 4,449,248 A | | 5/1984 | Leslie et al. |
| 4,460,120 A | | 7/1984 | Shepard et al. |
| 4,477,809 A | | 10/1984 | Bose |
| 4,479,261 A | | 10/1984 | Oda et al. |
| 4,587,661 A | | 5/1986 | Schiff |
| 4,612,637 A | | 9/1986 | Davis et al. |
| 4,654,654 A | | 3/1987 | Butler et al. |
| 4,661,902 A | | 4/1987 | Hochsprung et al. |
| 4,673,805 A | | 6/1987 | Shepard et al. |

(Continued)

FOREIGN PATENT DOCUMENTS

| | | |
|---|---|---|
| DE | 3304451 | 10/1984 |
| EP | 0075310 | 3/1983 |
| EP | 0131662 | 1/1985 |
| EP | 0303020 | 2/1989 |
| EP | 0314217 | 5/1989 |
| EP | 0319219 | 6/1989 |

(Continued)

OTHER PUBLICATIONS

Daka, et al, "A high performance broadcast file transfer protocol," Computer Communication Review, SIGCOMM '88 Symposium Stanford, CA, Aug. 1988, vol. 18, No. 4, pp. 274–281, New York, NY.

(Continued)

*Primary Examiner*—Roland G. Foster

(57) ABSTRACT

A packet data transmission system is used to link a number of remote hand-held data-gathering units such as bar code readers to a central computer which maintains a database management system. Data packets are sent from the remote units by an RF link to intermediate base stations, then sent by the base stations to the central computer by a serial link. Direct sequence spread spectrum modulation is used for the RF link. The remote hand-held units initiate an exchange using RF transmission to and from the base stations, receiving only during a rigid time window following a transmission from the remote unit. The base stations cannot initiate communication to the remote units, but instead send data to the remote units only as part of the exchange.

U.S. PATENT DOCUMENTS

| | | |
|---|---|---|
| 4,679,244 A | 7/1987 | Kawasaki et al. |
| 4,704,517 A | 11/1987 | Campisi et al. |
| 4,720,710 A | 1/1988 | Akahori et al. |
| 4,736,095 A | 4/1988 | Shepard et al. |
| 4,758,717 A | 7/1988 | Shepard et al. |
| 4,771,448 A | 9/1988 | Koohgoli |
| 4,777,488 A | 10/1988 | Carlman, Jr. et al. |
| 4,792,947 A | 12/1988 | Takiyasu et al. |
| 4,807,222 A | 2/1989 | Amitay |
| 4,807,261 A | 2/1989 | Johnson |
| 4,811,379 A | 3/1989 | Grandfield |
| 4,857,716 A | 8/1989 | Gombrich et al. |
| 4,882,770 A | 11/1989 | Miyahira et al. |
| 4,910,794 A | 3/1990 | Mahany |
| 4,928,096 A | 5/1990 | Leonardo et al. |
| 4,940,963 A | 7/1990 | Gutman et al. |
| 4,979,168 A | 12/1990 | Courtois et al. |
| 5,006,996 A | 4/1991 | Nakamura et al. |
| 5,010,241 A | 4/1991 | Butterworth |
| 5,020,093 A | 5/1991 | Pireh |
| 5,046,066 A | 9/1991 | Messenger |
| 5,056,106 A | 10/1991 | Wang et al. |
| 5,056,107 A | 10/1991 | Johnson et al. |
| 5,101,501 A | 3/1992 | Gilhausen et al. |
| 5,123,029 A | 6/1992 | Bantz et al. |
| 5,212,806 A | 5/1993 | Natarajan |
| 5,241,542 A | 8/1993 | Natarajan et al. |
| 5,243,641 A | 9/1993 | Evans et al. |
| 5,295,154 A | 3/1994 | Meier et al. |
| 5,303,240 A | 4/1994 | Borras et al. |
| 5,584,048 A | 12/1996 | Wieczorek |

FOREIGN PATENT DOCUMENTS

| | | |
|---|---|---|
| JP | 53-108310 | 9/1978 |
| JP | 55-136733 | 10/1980 |
| JP | 61-071738 | 4/1986 |
| JP | 61-270930 | 12/1986 |
| JP | 63-198438 | 8/1988 |
| JP | 2-137533 | 5/1990 |
| JP | 2-165733 | 6/1990 |
| WO | WO 8804496 | 6/1988 |

OTHER PUBLICATIONS

U. Grob, et al, "Microcellular Direct–Sequence Spread Spectrum Radio System Using N–Path RAKE Receiver," IEEE Journal on Selected Areas In Communications, vol. 8, No. 5, Jun. 1990, New York, NY.

Leonard Kleinrock, et al., "Packet Switching in Radio Channels: Part I—Carrier Sense Multiple–Access MOdes and Their Throughput–Delay Characteristics", IEEE Transactions on Communications, vol. Com–23., No. 12, Dec. 1975, pp. 1400–1416.

B.S. Tsybakov, et al., "Packet Transmission in Radio Networks", Reprinted with permission from Problemy Peredacti Informaisii, vol. 21, No. 1, pp. 80–101, Jan.–Mar. 1985, pp. 330–341.

Norman Abramson, "The Throughput of Packet Broadcasting Channels", IEEE Transactions on Communication, vol. Com – 25, No. 1, Jan. 1977, pp. 117–128.

J.M. Wozencraft, et al., "Coding for Two–Way Channels", Research Laboratory of Electronics and Lincoln Laboratory, Massachusetts Institute of Technology, pp. 11–25.

Simon S. Lam, et al., "Packet Switching in a Multiaccess Broadcast Channel: Dynammic Control Procedures", Transactions on Communications, vol. Com – 23, No. 9, Sep. 1975, pp. 891–904.

Michael J. Ferguson, "On the Control, Stability, and Waiting Time in a Slotted Aloha Random–Access System", IEEE Transactions on Communication, Nov. 1975, pp. 1300, 1308 and 1310.

J.J. Spilker, Jr. Ph.D., "Digital Communications by Satellite", 1977, pp. 449–450, 452–453 and 468.

John M. Wozencraft, et al., "Coding For Two–Way Channels", Technical Report 383, Jan. 3, 1961, pp. 1–16.

Lawrence G. Roberts, "Extensions of Packet Communication Technology to a Hand Held Personal Terminal", Spring Joint Computer Conference, 1972, pp. 295–298.

Mario Tokoro, et al., "Acknowledging Ethernet", pp. 1–6.

Robert E. Kahn, et al., "Advances in Packet Radio Technology", Proceeding of the IEEE, vol. 66, No. 11, pp. 1468–1496.

R. Binder, et al., "Aloha Packet Broadcasting—A Retrospect", AFIPS Conference Proceedings, 1975 National Computer Conference, May 19–22, 1975, pp. 203–215.

Norman Abramson, "The Aloha System—Another Alternative for Computer Communications", AFIPS Conference Proceedings, vol. 37, 1970 Fall Joint Computer Conference, Nov. 17–19, 1970, pp. 281–285.

Richard Binder, et al., "The Alohanet Menehune—Version II", Sponsored by Advanced Research Projects Agency, ARPA Order No. 1956, Sep. 1974, pp. 1–55.

Andrew S. Tanenbaum "Computer Networks" 2nd Ed., Ch. 3, 1988, pp. 182–193.

"Digital Terminals for Packet Broadcasting", AFIPS Conference Proceedings, 1975 National Computer Conference, May 19–22, 1975, pp. 254–261.

MSI PRT Portable Radio Terminal, 2 pages.

Norman Abramson, "Packet Switching with Satellites", AFIPS Conference Proceedings, 1973 National Computer Conference and Exposition, vol. 42, Jun. 4–8, 1973, pp. 695–702.

Leonard Kleinrock, et al., "Random Access Techniques for Data Transmission Over Packet–Switched Radio Channels", AFIPS Conference Proceedings, 1975 National Computer Conference, May 19–22, 1975, pp. 187–201.

The Vectran VR1100 System: Your Link to Productivity, 11 pages.

Memorandum Order, *Symbol Technologies, Inc.* v. *Proxim Incorporated*, CA No. 01–801–SLR, Jul. 30, 2003, pp. 1–7.

Trial Transcript, vol. E, *Symbol Technologies, Inc.* V. *Proxim Incorporated*, C.A. No. 01–801–SLR, Sep. 12, 2003, pp. 1055, 1056, 1092, 1208.

English Abstract of EP0075310A; Circuit Arrangement for Telecommunication Exchanges, Especially Telephone Exchanges, with Devices for Securing the Transmission of Coded Signals.

Shu Lin and Daniel J. Costello, Jr., "Error Control Coding: Fundamentals and Applications," (pp. 458–465, 474–476), 1983, Prentice–Hall, Inc., Englewoods Cliff, NJ, US XP002310473, ISBN 0–13–283796.

Office Action dated Feb. 14, 2006, issued in the Reexamination of U.S. Patent No. 5,029,183, Control No. 90/007,617.

Certified Translation of German Patent No. DE 3304451, 21 pages (Oct. 18, 1984—Date of Publication of Patent).

English Language Abstract of Japanese Patent Publication No. JP 2–137533, data supplied by epacenet, 1 page (May 25, 1990—Date of Publication).

English Language Abstract of Japanese Patent Publication No. JP 2–165733, data supplied by espacenet, 1 page (Jun. 26, 1990—Date of Publication).

English Language Abstract of Japanese Patent Publication No. JP 53–108310, data supplied by espacenet, 1 page (Sep. 21, 1978—Date of Publication).

English Language Abstract of Japanese Patent Publication No. JP 55–136733, data supplied by espacenet, 1 page (Oct. 24, 1980—Date of Publication).

English Language Abstract of Japanese Patent Publication No. JP 61–071738, data supplied by espacenet, 1 page (Apr. 12, 1986—Date of Publication).

English Language Abstract of Japanese Patent Publication No. JP 61–270930, data supplied by espacenet, 1 page (Dec. 1, 1986—Date of Publication).

English Language Abstract of Japanese Patent Publication No. JP 63–198438, data supplied by espacenet, 1 page (Aug. 17, 1988—Date of Publication).

*Symbol Technologies, Inc.* v. *Proxim Incorporated*; C.A. No. 01–801–SLR; Memorandum Order.

Binder et al. "Aloha Packet Broadcasting: A Retrospect" AFIPS National Computer Conference Proceedings vol. 44 (May 19–22, 1975), pp. 203–215.

Fralick et al. "Digital Terminals for Packet Broadcasting" AFIPS National Computer Conference (NCC) Proceedings vol. 44 (May 19–22, 1975), pp. 253–262.

Kleinrock et al. "Packet Switching in Radio Channels: Part I—Carrier Sense Multiple–Access Modes and Their Throughput–Delay Characteristics," IEEE Transactions on Communications, vol. 23, No. 12, Dec. 1975, pp. 1400–1416.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2–6 and 8–12, dependent on an amended claim, are determined to be patentable.

1. A method of transmitting data packets from one of a plurality of remote terminal units *in a power save mode of operation* to a base station, comprising the steps of:
   a) transmitting a data packet from said one unit to said base station during a first time period selected by the unit;
   b) receiving at said one unit from said base station a reply signal during a second time period occurring only during a selected time window after said first time period, said second time period being the same for at least some of said units *wherein steps (a) and (b) are performed during said power save mode of operation in which said base station cannot initiate data communications with said one of said plurality of remote terminal units*.

7. A system for transmitting data packets from one of a plurality of first stations to a second station *wherein said plurality of first stations have a power save mode of operation in which said second station cannot initiate data communications with said plurality of first stations*, comprising:
   a) a transmitter in said one first station for transmitting a data packet from said one first station to the second station during a first time period selected by said one first station;
   b) a receiver in said one first station for receiving a reply signal from the second station during a second time period occurring only in a time window referenced to said first time period by a selected delay, said selected delay being the same for all said plurality of first stations *wherein said transmitting and receiving are performed during said power save mode of operation*.

* * * * *